United States Patent [19]
Nishikawa et al.

[11] Patent Number: 4,945,482
[45] Date of Patent: Jul. 31, 1990

[54] TRANSMISSION CONTROL SYSTEM

[75] Inventors: Seiichi Nishikawa, Toyokawa; Yoshiharu Harada; Kagenori Fukumura, both of Toyota; Yoichi Hayakawa, Toyoake; Masao Kawai, Chiryu, all of Japan

[73] Assignees: Aisin-Warner Limited, Anjo; Toyota Jidosha Kabushiki Kaisha, Toyota, both of Japan

[21] Appl. No.: 257,149

[22] Filed: Oct. 12, 1988

Related U.S. Application Data

[63] Continuation of Ser. No. 819,730, Jan. 17, 1986, abandoned.

[30] Foreign Application Priority Data

Jan. 19, 1985 [JP] Japan ................................. 60-7771

[51] Int. Cl.$^5$ ..................... G05D 17/02; B60K 41/08; B60K 23/08
[52] U.S. Cl. .................... 364/424.1; 74/866; 74/869; 74/878; 180/245; 475/128
[58] Field of Search ............... 364/424.1; 74/866, 867, 74/868, 869, 878, 740, 745; 180/245, 247

[56] References Cited

U.S. PATENT DOCUMENTS

| 4,324,153 | 4/1982 | Sugimoto et al. | 74/866 |
|---|---|---|---|
| 4,369,671 | 1/1983 | Matsumoto et al. | 74/740 |
| 4,480,505 | 11/1984 | Takano et al. | 74/866 |
| 4,495,457 | 1/1985 | Stahl | 364/424.1 |
| 4,562,541 | 12/1985 | Sakakiyama | 364/424.1 |
| 4,608,873 | 9/1986 | Redzinski | 74/866 |
| 4,660,672 | 4/1987 | Katou | 74/868 |
| 4,688,449 | 8/1987 | Harada et al. | 74/866 |
| 4,726,262 | 2/1988 | Hayakawa et al. | 74/866 |

Primary Examiner—Felix D. Gruber
Attorney, Agent, or Firm—Spencer & Frank

[57] ABSTRACT

A transmission control system for controlling a transmission. The system has a main transmission with a speed changing mechanism and an output shaft, a substransmission connected to the output shaft, and a control system for receiving outputs from a number of sensors which sense the running state of the vehicle. The control system itself has two outputs, there being two separate hydraulic controls connected to the two system outputs, respectively. The two hydraulic controls control the speed changing mechanisms of the main and subtransmissions, respectively. Also provided is a hydraulic pressure source which supplies a working fluid to the two hydraulic controls. The control system determines whether the main and subtransmissions are in a transient period of the speed changing operation and, as long as one of the two transmissions is in the transient period, inhibits the speed changing operation of the other transmission.

3 Claims, 21 Drawing Sheets

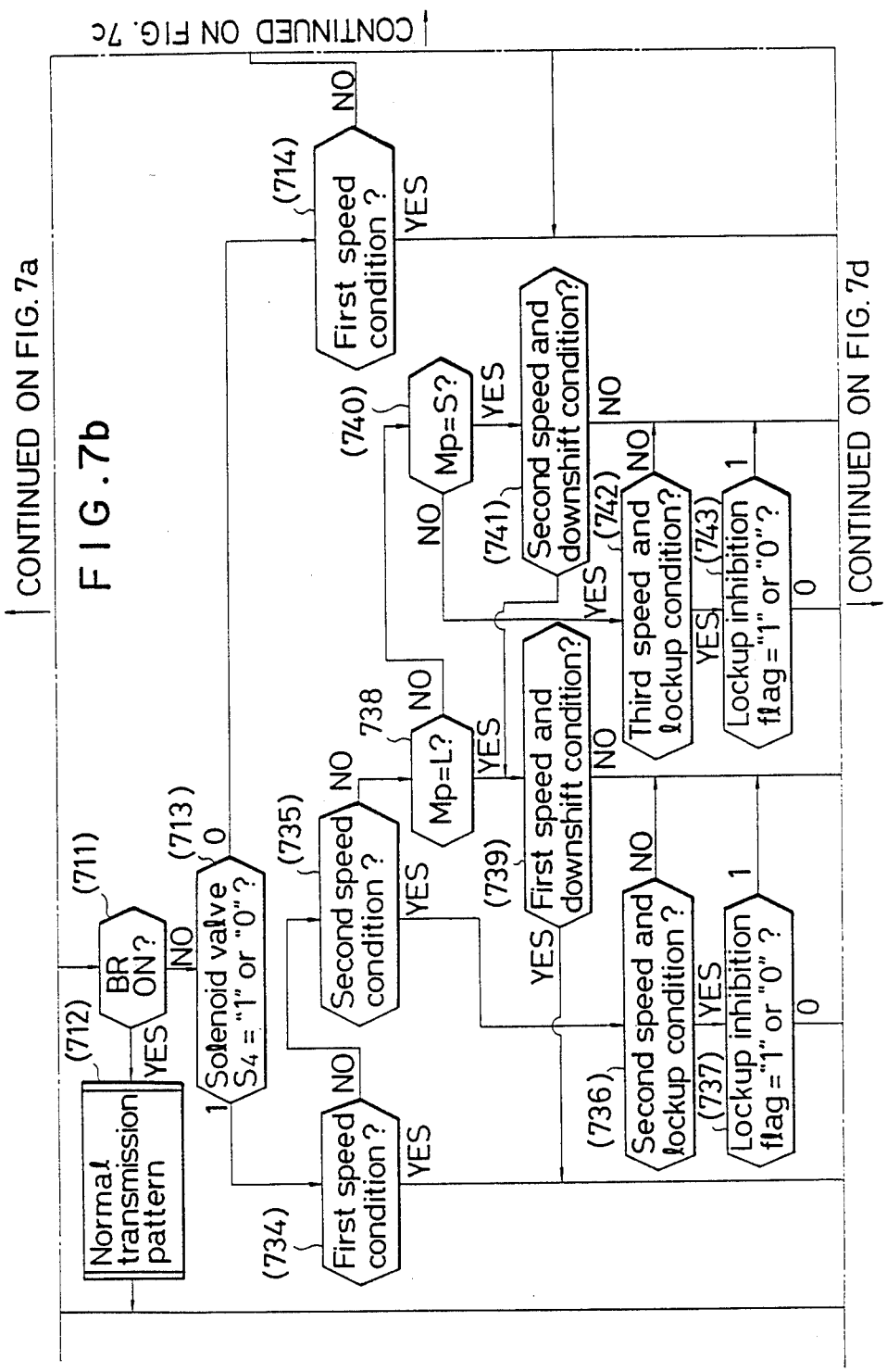

| FIG.8a | FIG.8c | FIG.8e |
| FIG.8b | FIG.8d | |

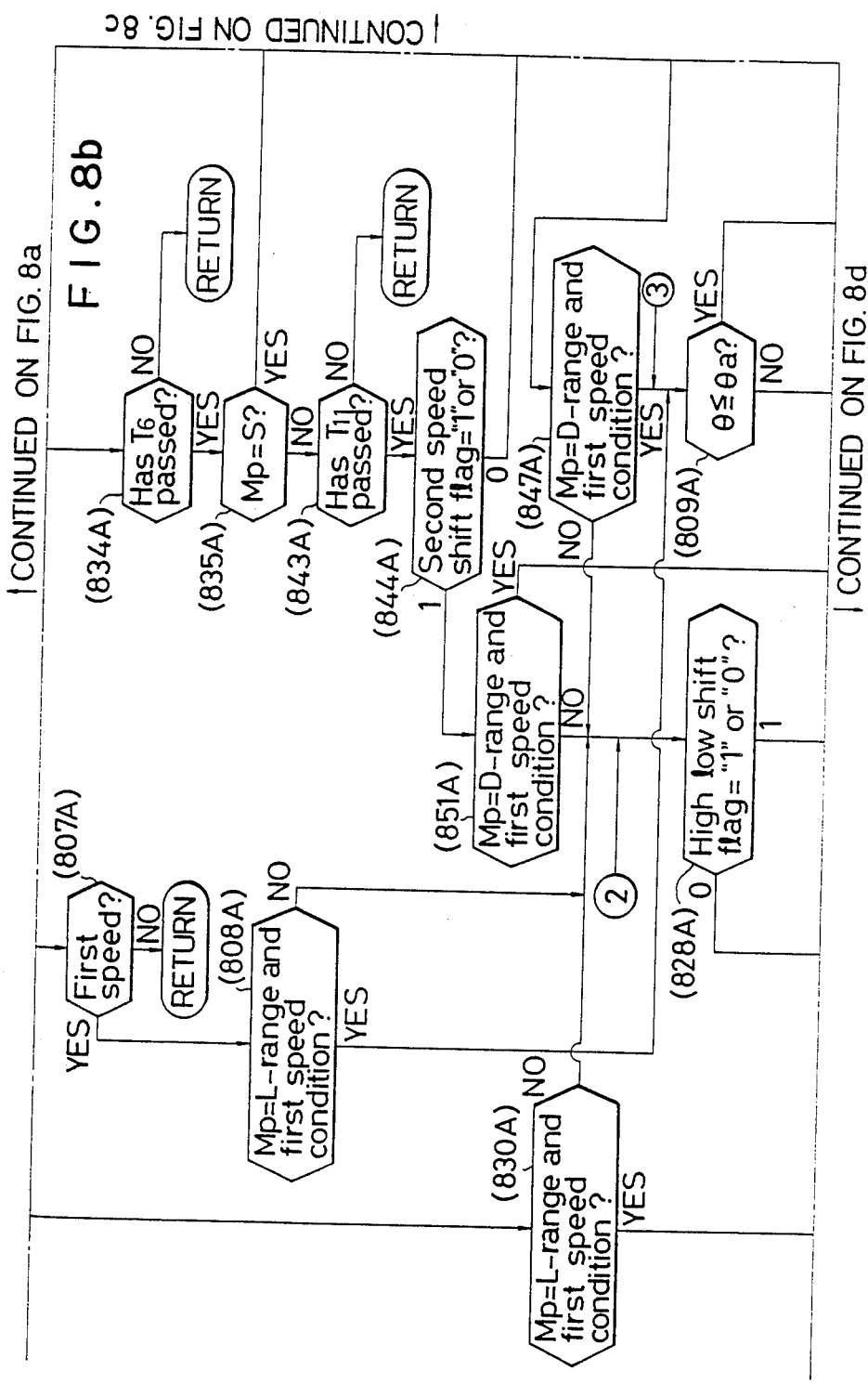

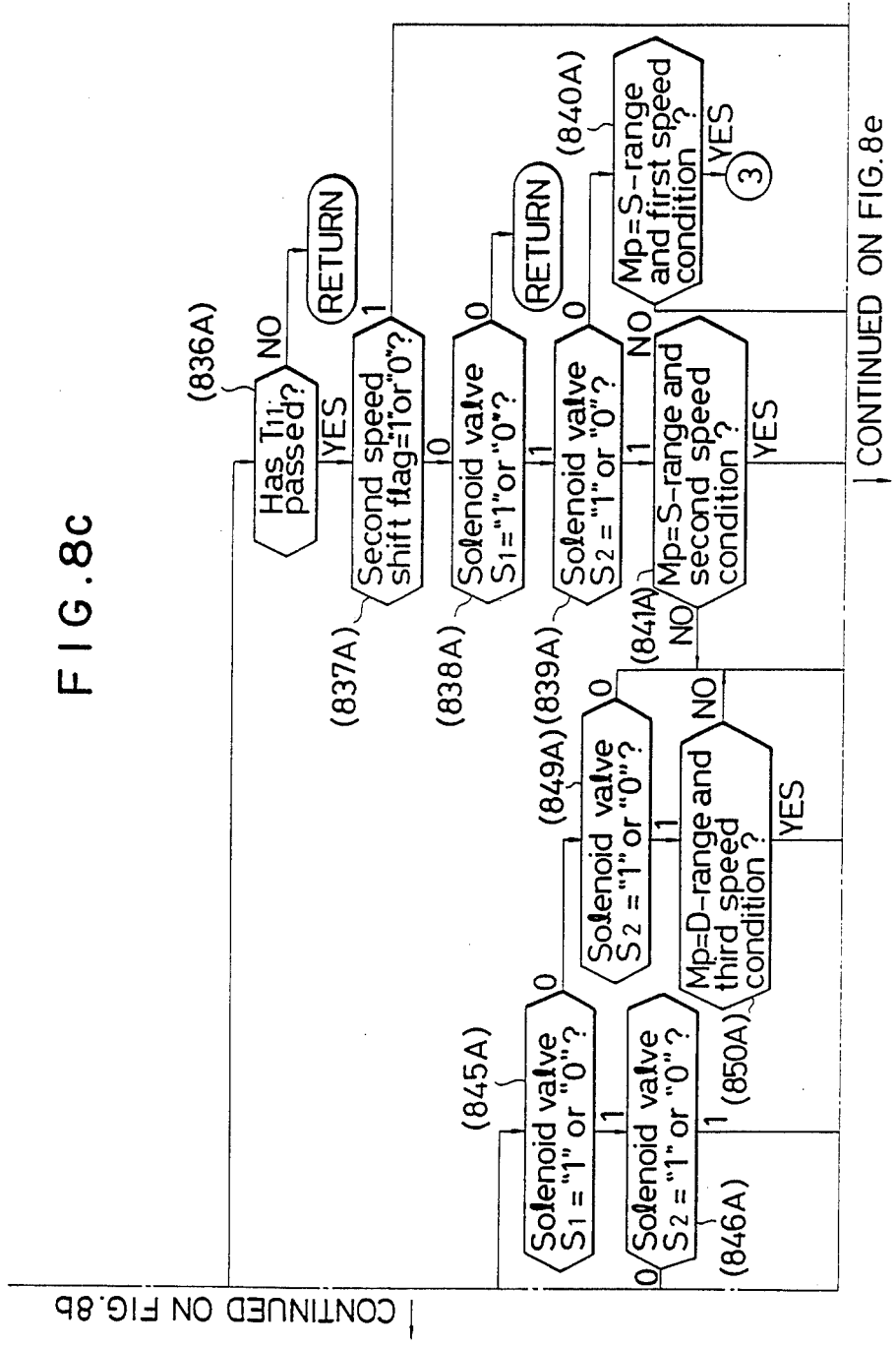

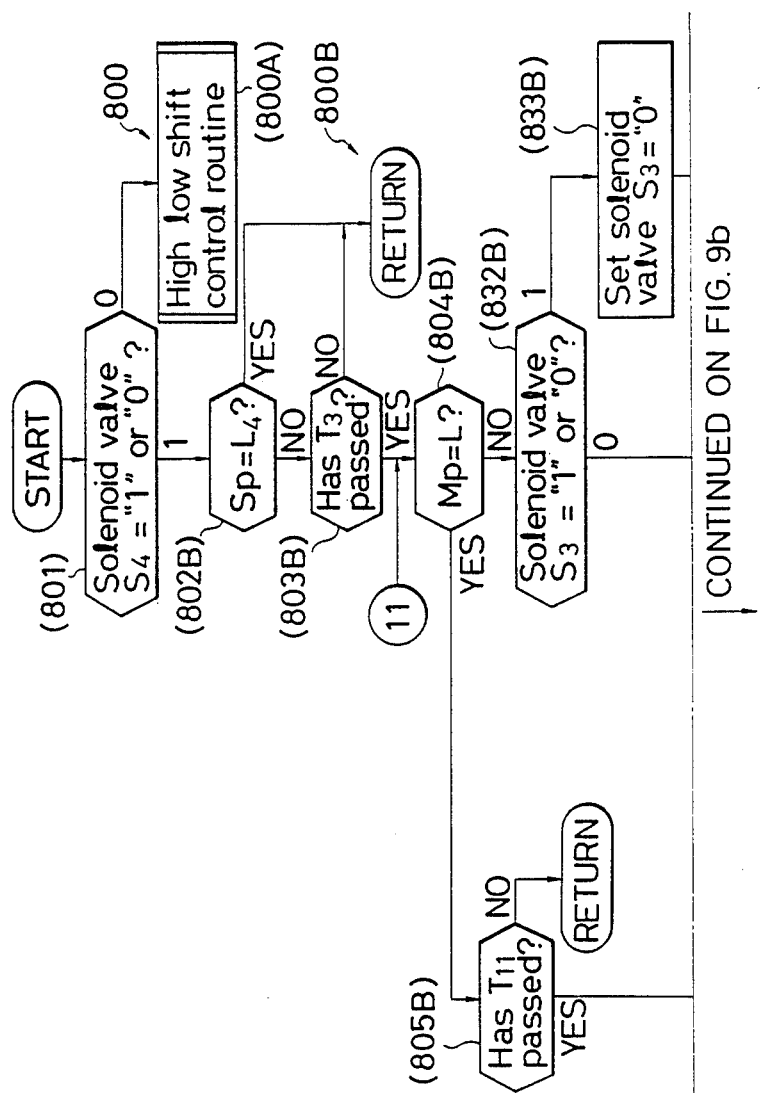

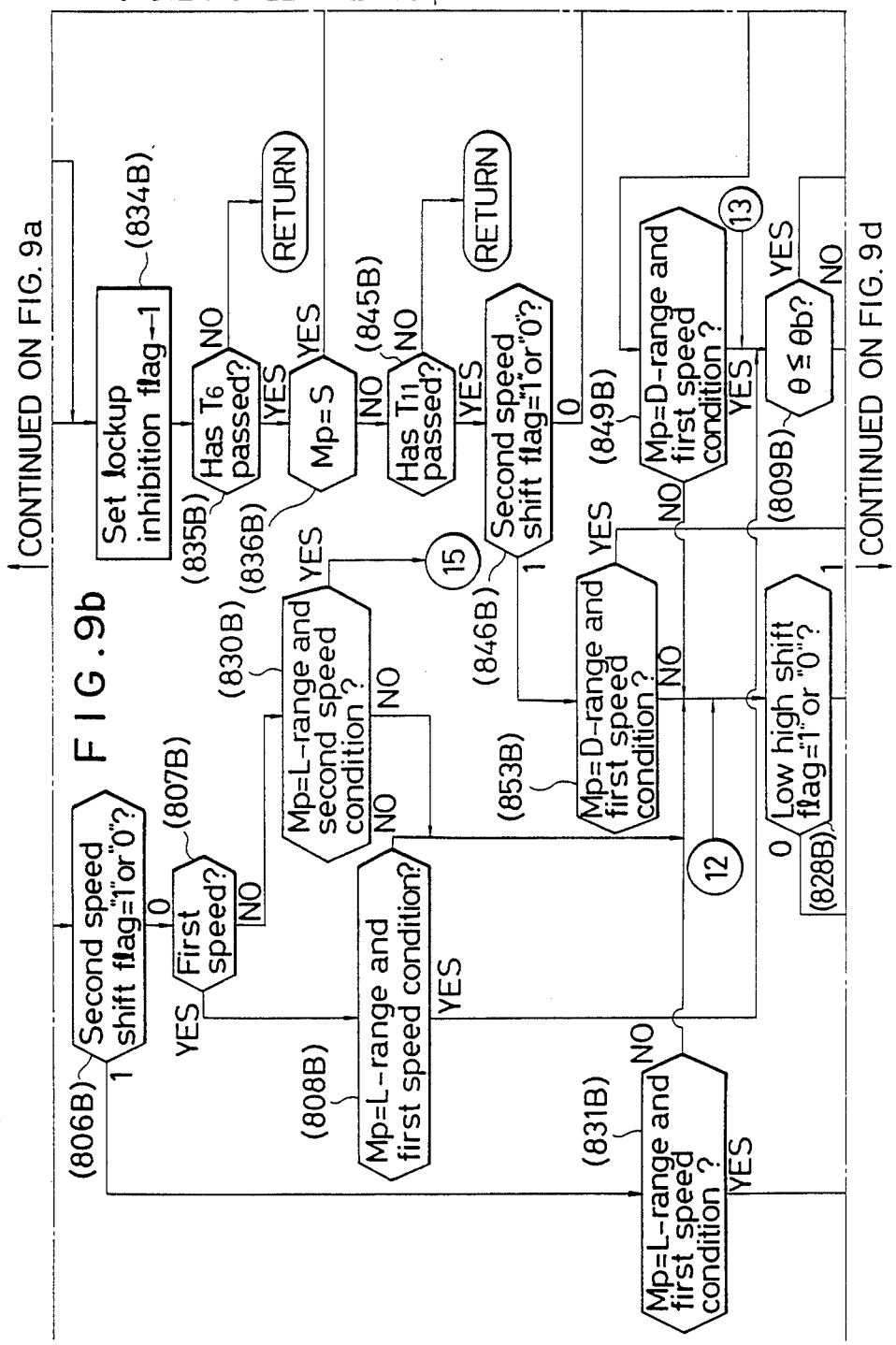

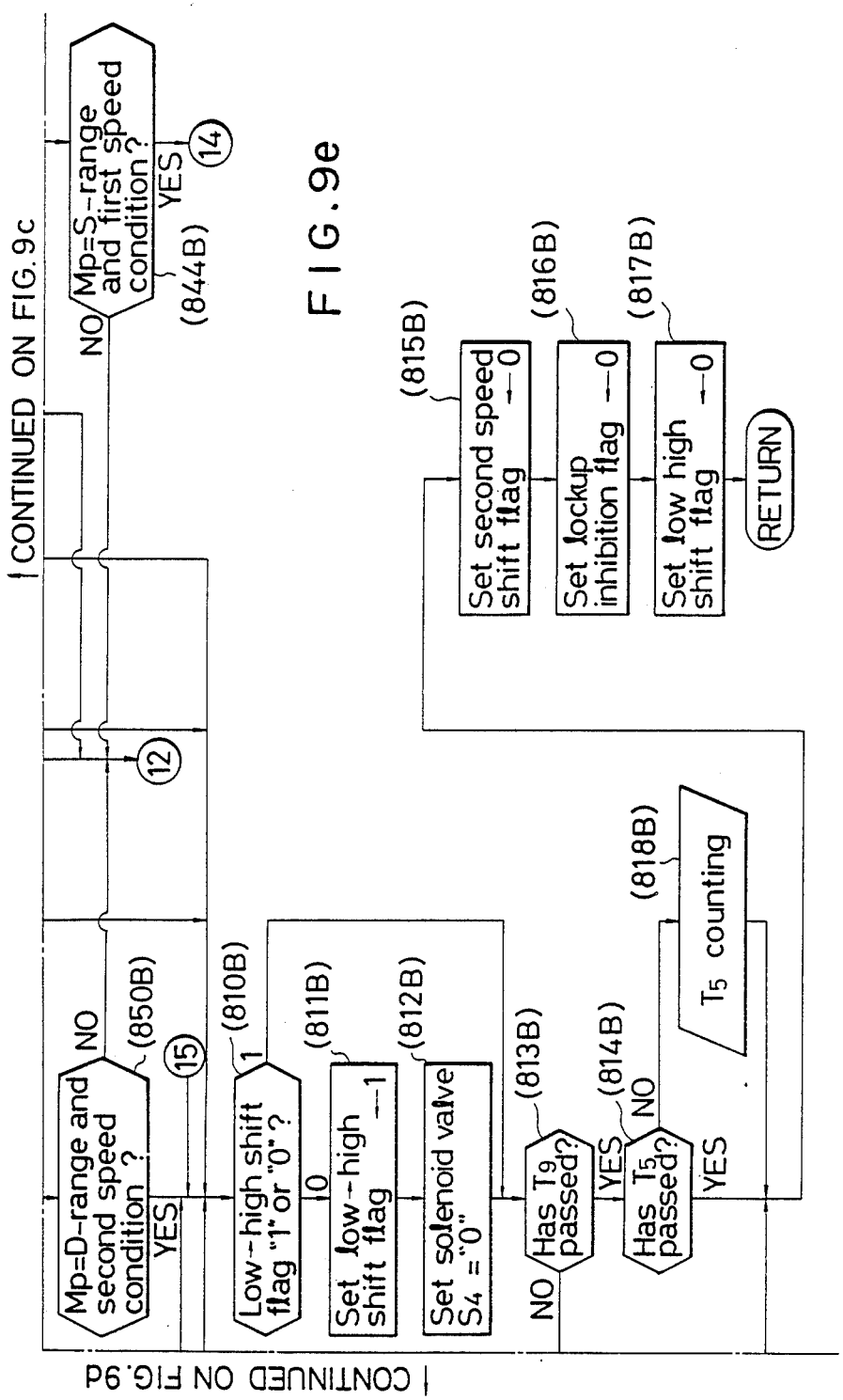

TRANSMISSION CONTROL SYSTEM

This application is a continuation, of application Ser. No. 06/819,730, filed Jan. 17, 1986 and now abandoned.

BACKGROUND OF THE INVENTION

1. Field of the Invention

The present invention relates to a transmission comprising a main transmission and a transfer and, more particularly, to a transmission control system for controlling such a transmission.

2. Description of the Prior Art

In a conventional automotive transmission having a main transmission gear which changes the input revolving speed, namely, the output revolving speed of the engine, and a transfer gear which changes the input revolving speed, namely, the output revolving speed of the main transmission gear, for example, a transmission having a main transmission gear comprising a plurality of speeds, a hydraulic control system for controlling the speed and a control system for controlling the hydraulic control system on the basis of input signals given thereto, such as the running speed of the vehicle and the degree of opening of the throttle valve, and a transfer gear employing the output shaft of the main transmission gear as the input shaft thereof and being capable of manual speed change, the speed of the main transmission is changed according to the running condition of the vehicle, such as the running speed of the vehicle and the degree of opening of the throttle valve, even during the shifting operation of the transfer gear, and also the transfer gear is shifted even during the shifting operation of the main transmission gear. Accordingly, the variation of the input torque of the transfer gear due to the shifting operation of the main transmission gear and the variation of the output torqe of the transfer gear due to the shifting operation of the transfer gear enhance the shock of shifting operation.

Shifting operation requires a time from the provision of a shift command till the placement of the shift valve in a position corresponding to the shift command, and a time from the placement of the shift valve in a position corresponding to the shift command till the completion of the shifting operation. When another shift command is provided while the fluid pressure supplied to the clutches and/or the brakes of the transmission is transient after the shift valve has been set in the desired position, the shift valve is changed again according to the new shift command for the new shifting operation. In such a shifting operation, since the fluid pressure supplied to the clutches and/or the brakes is transient and unstable, the new shift command makes the fluid pressure further unstable, and hence the shifting characteristics of such a transmission is unsatisfactory.

SUMMARY OF THE INVENTION

Accordingly, it is an object of the present invention to provide a transmission control system capable of inhibiting the shift operation of either the main transmission or the transfer gear (hereafter also referred to as transfer) during the shift operation of the other and cancelling the shift command given to the other while the shift of the other is inhibited.

The object of the present invention is achieved by a transmission control system for controlling a transmission comprising a main transmission and a transfer, (also referred to as a subtransmission) capable of inhibiting the shifting operation of either the main transmission or the transfer during the shifting operation of the other and cancelling a shift command given to either the main transmission or the transfer in a predetermined shift inhibition time.

A transmission control system according to the present invention provides a shift command for either the main transmission or for the transfer and, when another shift command is provided within a set shift inhibition time in which the shift operation of the other is inhibited, cancels the preceding shift command so that the succeeding shift command is executed.

The above and other objects, features and advantages of the present invention will become more apparent from the following description thereof taken in conjunction with the accompanying drawings.

DESCRIPTION OF THE PREFERRED EMBODIMENT

A transmission control system, in a preferred embodiment, according to the present invention will be described hereinafter.

Figure 1:
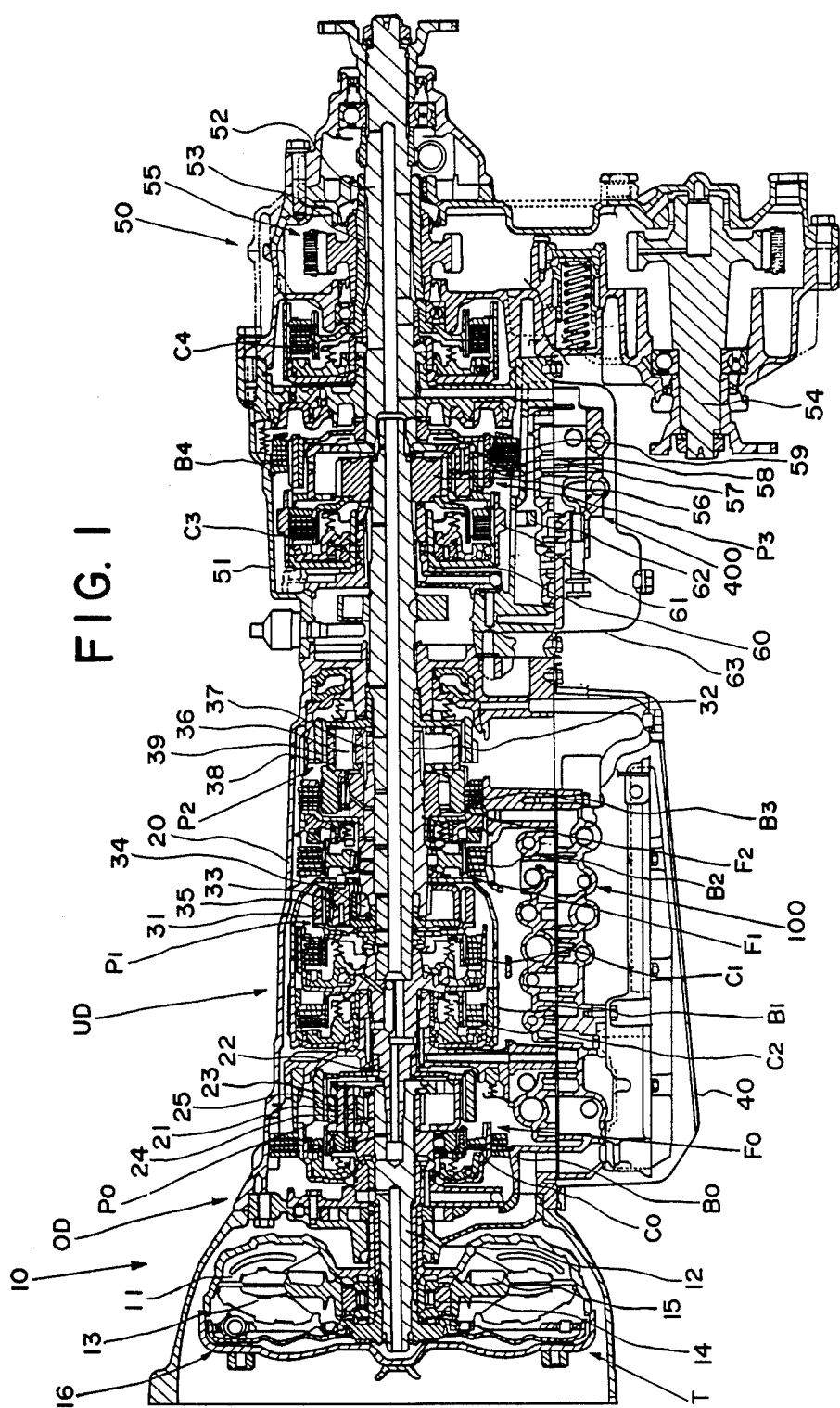
FIG. 1 is a sectional view of an automotive four-wheel drive transmission.
Figure 2:
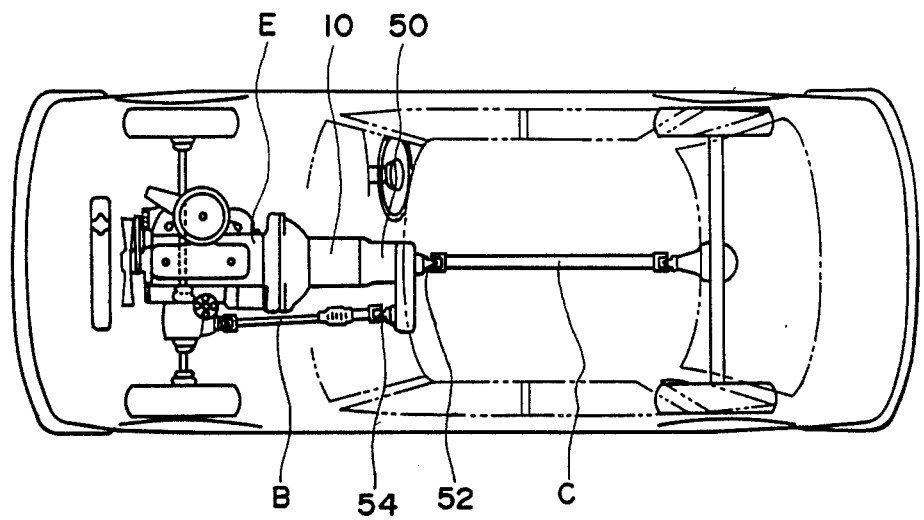
FIG. 2 is a schematic illustration of a driving system for a four-wheel drive automotive vehicle.

FIGS. 1 and 2 show a four-speed and reverse automatic transmission and a transfer gear for four-wheel drive, respectively. In FIGS. 1 and 2, there are shown a main transmission gear 10, namely, a four-speed automatic transmission with overdrive and a transfer gear 50 for four-wheel drive fastened to the rear end of the planetary gearing of the main transmission gear 10. The output shaft 32 of the main transmission gear 10 serves also as the input shaft of the transfer gear 50. The first output shaft 52 and the second output shaft 54 of the transfer gear 50 are connected to a rear propeller shaft C for driving the rear wheels and a front propeller shaft B for driving the front wheels, respectively.

The main transmission gear 10 comprises a hydraulic torque converter T, an overdrive OD, and a three-speed and reverse underdrive UD.

The hydraulic torque converter T comprises an impeller 11 connected to the output shaft of the engine E, a turbine 13 connected to the output shaft 12 thereof, a stator 15 connected through a one-way clutch 14 to a fixed member, and a direct coupling clutch 16. The output shaft 12 of the hydraulic torque converter T serves also as the input shaft of the overdrive OD.

The overdrive OD comprises friction coupling devices, namely, a multiple disc clutch CO, a multiple disc brake BO and a one-way clutch FO, and a planetary gearing PO having components to be fixed to or released from a fixed member, such as a main transmission gear case 20, or to be connected to or disconnected from the input shaft or the output shaft through the selective engagement of the friction coupling devices.

The planetary gearing PO comprises a carrier 21 fixed to the output shaft 12 of the hydraulic torque converter T, a ring gear 23 connected to the output shaft 22 of the overdrive OD, a sun gear 24 rotatably mounted on the input shaft 12, adapted to be fixed to the main transmission gear case 20 by means of the brake BO and connected to the carrier 21 through the clutch CO and the one-way clutch FO disposed in parallel to the clutch CO, and planetary pinions 25 rotatably mounted on the carrier 21 and meshing with the sun gear 24 and the ring gear 23.

The output shaft of the overdrive OD serves also as the input shaft of the three-speed and reverse underdrive UD.

The underdrive UD comprises friction coupling devices, namely, multiple disc clutches C1 and C2, a belt brake B1, multiple disc brakes B2 and B3 and one-way clutches F1 and F2, a front planetary gearing P1, and a rear planetary gearing P2.

The front planetary gearing P1 comprises a ring gear 31 connected to the output shaft 22 through the clutch C1, a carrier 33 connected to the output shaft 32 of the underdrive UD, a sun gear 34 connected to the output shaft 22 through the clutch C2 and adapted to be fixed to the main transmission gear case 20 through the belt brake B1, the brake B2 disposed in parallel to the belt brake B1 and the one-way clutch F1 disposed coaxially with the brake B2, and planetary pinions 35 rotatably supported on the carrier 33 and meshing with the sun gear 34 and the ring gear 31.

The rear planetary gearing P2 comprises a carrier 36 adapted to be fixed to the main transmission sun gear 20 through the brake B3 and the one-way clutch F2 disposed in parallel to the brake B3, a sungear 37 formed integrally with the sun gear 34 of the front planetary gearing P1, and planetary pinions 39 rotatably supported on the carrier 36 and meshing with the sun gear 37 and the ring gear 38.

The friction coupling devices, namely, the clutches and the brakes, of the main transmission gear 10 are engaged or disengaged selectively according to the running condition of the vehicle, such as the running speed and the degree of opening of the throttle valve, by a main hydraulic control unit 100 provided in an oil pan 40 attached to the bottom of the main transmission gear case 20 and provided at the bottom thereof with an oil strainer 101, for automatic four-speed transmission including overdrive (O/D) and manual reverse.

The transfer gear case 51 of the transfer gear 50 is fastened to the rear end of the main transmission gear case 20 with a plurality of bolts so as to receive the output shaft 32 of the main transmission gear 10 as the input shaft thereof. The output shaft 32 of the underdrive UD serves as the input shaft of the clutches C3 and C4 and the brake B4. The transfer gear 50 comprises a first output shaft 52 extended coaxially with the output shaft 32, a planetary gearing P3 interconnecting the output shaft 32 and the first output shaft 52, a sleeve 53 for four-wheel drive rotatably mounted on the first output shaft 52, a second output shaft 54 extended in parallel to the output shaft 32 having an output end opposite to that of the first output shaft 52, and a power transmitting mechanism 55 interconnecting the sleeve 53 and the second output shaft 54. The planetary gearing P3 comprises a sun gear 56 splined to the rear end of the output shaft 32, planetary pinions 57 meshing with the sun gear 56, a ring gear 58 meshing with the planetary pinions 57, and a carrier 59 rotatably supporting the planetary pinions 57 and connected to the front end of the first output shaft 52 of the transfer gear 50. A parking gear 61 are formed over the outer circumference of a cylinder 60 connected to the carrier 59. When the shift lever, not shown, of the main transmission gear 10 is placed in the parking range, a detent engages the parking gear 61 to fix the first output shaft 52.

The clutches and brakes of the transfer gear 50 are engaged or disengaged selectively by an auxiliary hydraulic control unit 400 provided in an oil pan 63 attached to the bottom of the transfer gear case 51.

Figure 3:
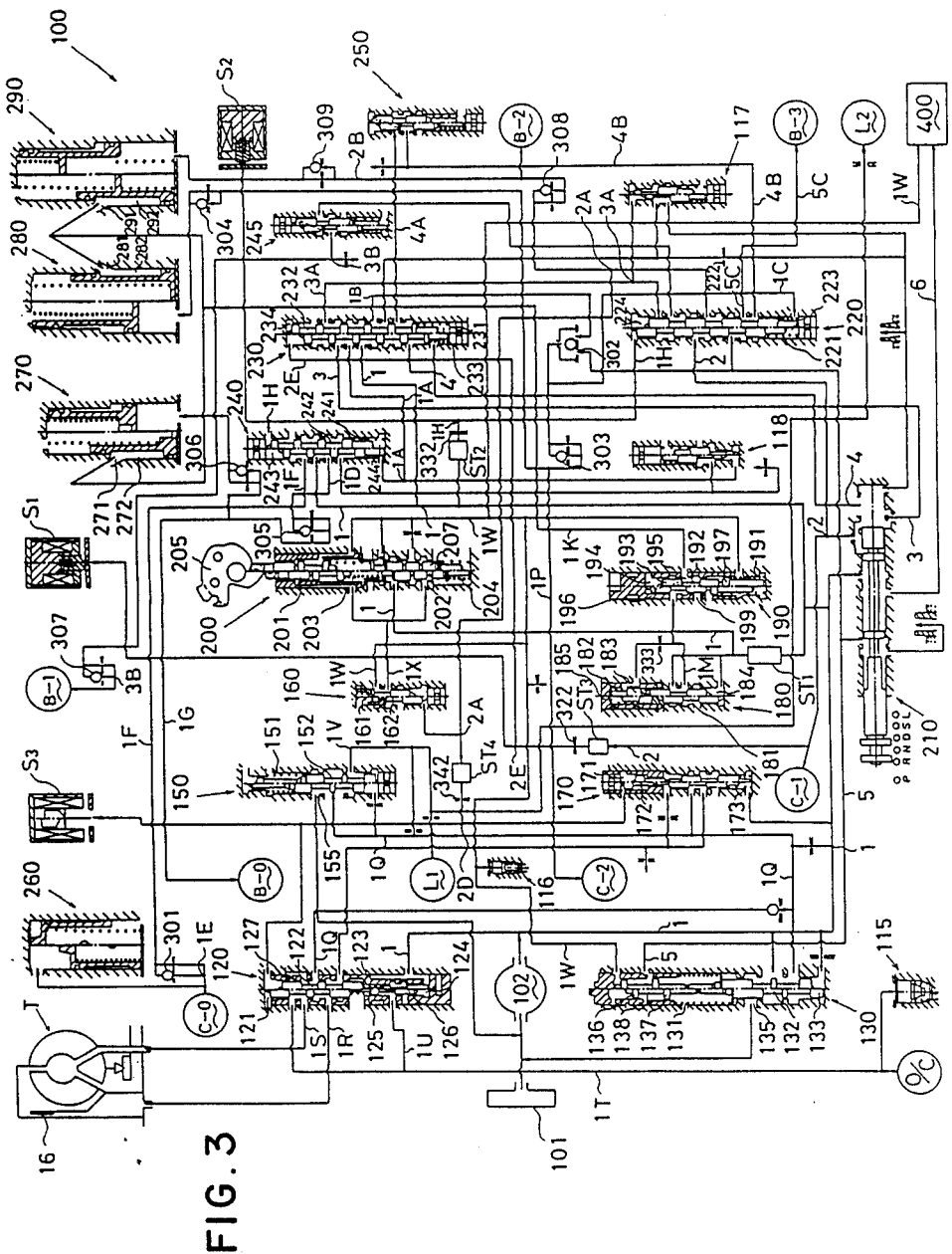
FIG. 3 is a hydraulic circuit diagram of a hydraulic control system for an automatic transmission.

FIG. 3 shows the main hydraulic control unit 100 of the main transmission gear 10. The main hydraulic control unit 100 comprises: the oil strainer 101 provided within the oil pan 40; an oil pump 102; an oil cooler O/C; a cooler by-pass valve 115 for regulating the fluid pressure that works on the oil cooler O/C; a pressure relief valve 116; a release clutch control valve 117; a release brake control valve 118; a lockup relay valve 120; a pressure regulating valve 130 for regulating the fluid pressure supplied thereto to supply a line pressure to a line 1; a second pressure regulating valve 150 for supplying the fluid to the lubrication line L1 of the main transmission gear 10 and to the working fluid supply line L2 of the transfer gear 50; a cutback valve 160; a lockup control valve 170; a first accumulator control valve 180; a second accumulator control valve 190, a throttle pressure valve 200; a manual valve 210 for distributing the line pressure of the line 1 to lines 2 to 6; a 1-2 shift valve 220; a 2-3 shift valve 230; a 3-4 shift valve 240; an intermediate coast modulator valve 245 for regulating the supply pressure of the brake B1; a low-coast modulator valve 250 for regulating the supply pressure of the hydraulic servomechanism B-3 of the brake B3; an accumulator 260 for smoothly engaging the clutch CO; an accumulator 270 for smoothly engaging the brake BO; an accumulator 280 for smoothly engaging the clutch C2; an accumulator 290 for smoothly engaging the brake B2; hydraulic servomechanisms C-0, C-1 and C-2 for the clutches C0, C1 and C3, respectively, hydraulic servomechanisms B-0, B-1, B-2 and B-3 for the brakes B0, B1, B2 and B3, respectively; flow control valves with check valve 310, 303, 304, 305, 306, 307, 308 and 309 for controlling the flow rate of the working fluid; a shuttle valve 302, oil strainers ST1, ST2, ST3 and ST4; a first solenoid valve S1 which is controlled by an electronic control unit 600 (computer), which will be described afterward, to control the 2-3 shift valve 230; a second solenoid valve S2 for controlling the 1-2 shift valve 220 and the 3-4 shift valve 240; a third solenoid valve S3 for controlling the lockup relay valve 120 and the lockup control valve 170; and lines interconnecting the valves and the hydraulic servomechanisms of the clutches and brakes.

The pressure of the working fluid pumped up from the oil pan 40 through the oil strainer 101 by the oil pump 102 is regulated at a predetermined pressure, namely, the line pressure, by the pressure regulating valve 130. The working fluid of the line pressure is supplied to the line 1.

The pressure regulating valve has a spool 132 biased downward, as viewed in FIG. 3, by a spring 131, and a plunger 138 disposed coaxially with the spool 132 and abutting on the spool 132. A throttle pressure applied through the line 1W to the upper land 136 of the plunger 138 and the spring force of the spring 131 work on the spool 132. When the transmission is in the reverse, the spool 132 is displaced by the line pressure applied through the line 5 to the lower land 137 of the plunger 138 and the feedback pressure of the line pressure applied to the lower land 133 of the spool 132 to regulate the sectional area of the passage connecting the lines 1 and 1Q to the drain port 135 to provide a line pressure corresponding to the running condition of the vehicle.

When the accelerator pedal is depressed, a cam 205 is turned according to the movement of the accelerator pedal. Then, a throttle plunger 201 is depressed by the cam 205 and moves a spool 202 biased upward by a spring 204 through a spring 203 interposed between the throttle plunger 201 and the spool 202 so that the line pressure supplied through the line 1 is regulated at a throttle pressure corresponding to the degree of opening of the throttle valve and the throttle pressure is supplied to the line 1W.

The second pressure regulating valve 150 has a spool 152 biased by a spring 151 abutting on the upper end of the same, as viewed in FIG. 3. The downward spring force of the spring 151 and the upward pressure fed back through the line 1Q work on the spool 152 to shift the spool 152 accordingly so that the sizes of paths connecting the line 1Q and the lubrication line 1V to a drain port 155 are regulated to regulate the pressure of the line 1Q at a predetermined secondary line pressure (torque converter pressure). Surplus fluid is supplied to the line 1V. The fluid supplied to the line 1V is supplied through the lubrication line L1 to the main transmission gear 10 and through the line L2 to the transfer gear 50.

The manual valve 210 is controlled manually by a shift lever provided beside the driver's seat and is shifted manually to a P-position (parking), R-position (reverse), N-position (neutral), D-position, (drive range), S-position (second speed) and L-position (low speed).

When not energized, the first solenoid valve S1 supplies a high-level solenoid pressure which is equal to the line pressure to the line 2E communicating with the line 2 through an orifice 322 and, when energized, drains the line 2E to supply a low-level solenoid pressure.

The second solenoid valve S2, when not energized, supplies the high-level solenoid pressure to the line 1H communicating with the line 1 through the orifice 322 and, when energized, drains the line 1H so supply the low-level solenoid pressure.

The third solenoid valve S3 controls the pressure in the upper chamber 121 of the lockup relay valve 120 communicating with the line 2A through an orifice 342 and the pressure in the upper chamber 171 of the lockup control valve 170. The third solenoid valve S3, when energized, supplies the high-level solenoid pressure to the upper chambers 121 and 171 to press the spools 122 and 172 downward, as viewed in FIG. 3, and, when not energized, drains the upper chambers 121 and 171 to supply the low-level solenoid pressure so that the spools 122 and 172 are moved to the upper positions by the line pressure and the spring force of the springs 123 and 173, respectively.

The 1-2 shift valve 220 has a spool 222 biased upward by a spring 221. When the second solenoid valve S2 is not energized and the high-level solenoid pressure is supplied to the line 1H, the high-level solenoid pressure is supplied to the upper chamber 224, and hence the spool 222 is moved to the lower position, namely, a first speed position and, when the second solenoid valve S2 is energized, the line 1H is drained and the lwo-level solenoid pressure is supplied to the upper chamber 224 to move the spool 222 to the upper position where a speed other than the first speed is provided. In the third speed or the fourth speed, the line pressure is supplied to the lower chamber 223 through the line 1C communicating with the line 1B via the line 1 and the 2-3 shift valve 230 to fix the spool 222 at the upper position regardless of the solenoid pressure.

The 2-3 shift valve 230 has a spool 232 biased upward, as viewed in FIG. 3, by a spring 231. When the first solenoid valve S1 is energized, the low-level solenoid pressure is supplied to the line 2E, and hence the spool 232 is moved to the upper position by the spring 231 to provide the first speed, the second speed and the reverse and, when the first solenoid valve S1 is not energized, the high-level solenoid pressure is supplied to the chamber 234 through the line 2E, so that the spool 232 is moved to the lower position to provide the third speed and the fourth speed. When the line pressure is supplied to the line 4, the line pressure is supplied to the lower chamber 233, and thereby the spool 232 is fixed at the upper position regardless of the solenoid pressure.

The 3-4 shift valve 240 has a spool 242 biased upward, as viewed in FIG. 3, by a spring 241. When the second solenoid valve S2 is not energized, the high-level solenoid pressure is supplied through the line 1H to the upper chamber 243, and thereby the spool 242 is shifted to the lower position to provide the fourth speed (overdrive range) and, when the second solenoid valve S2 is energized, the line 1H is drained, and thereby the spool 242 is shifted to the upper position by the spring 241. When the line pressure is supplied through the line 1 or 3, the 2-3 shift valve 230 and the line 1A to the lower chamber 244, the spool 242 is fixed at the upper position by the agency of the line pressure and the spring 241 to provide the speeds other than the fourth speed.

The cutback valve 160 has a spool 162 biased downward by a spring 161. The line pressure is supplied through the line 2A to the lower end of the spool 162. When the line pressure is supplied to the line 2A, the spool 162 is moved to the upper position, as viewed in FIG. 3, to allow the line 1W to which the throttle pressure is supplied to communicate with the cutback pressure output line 1X to supply the throttle pressure as the cutback pressure to the line 1X to apply the cutback pressure to the bottom land 207 of the spool 202 of the throttle valve 200 so that the throttle pressure prevailing within the line 1W is reduced. When the throttle pressure is thus reduced, the spool 132 of the pressure regulating valve 130 receiving the throttle pressure is shifted to the upper position so that the line 1 is drained through the drain port 135 to reduce the line pressure, namely, to cutback the line pressure.

The first accumulator control valve 180 has a spool 181 disposed at a lower position and a plunger 183 disposed coaxially with and above the spool 181 and biased downward by a spring 182. The spool 181 is moved by the combined action of the line pressure supplied to the lower chamber 184 through the line 1, the spring force of the spring 182 and the output pressure fed back through an orifice 333 and the line 1M to the upper chamber 185 to regulate the output pressure, which is applied through the line 1M to the second accumulator control valve 190.

The second accumulator control valve 190 has a spool 192 urged upward by a spring 191. An orifice 196 is formed in the top land 193 of the spool 192 to allow the upper chamber 194 to communicate with the intermediate chamber 195. The upward spring force of the spring 191 works on the spool 192. A throttle modulator pressure is applied through the line 1W to the bottom land 197 of the spool 192. The spool 192 is moved according to the feedback pressure supplied through the orifice 196 and the line 1M to the upper chamber 194. The output pressure of the second accumulator control valve 190 supplied to the line 1M is supplied through the line 1K and the back pressure ports 271, 281 and 291 of the accumulators 270, 280 and 290 to the back pressure chambers 272, 282 and 292 of the accumulators 270, 280 and 290, respectively, for back pressure control. The back pressure of the back pressure chambers 272, 282 and 292 is applied through the line 1K to the top land 193 of the spool 192 to move the spool 192 to the lower position so that the line 1K is able to communicate with the drain port 199 by means of the intermediate chamber 195, and thereby the line 1K is drained.

The shift lever, not shown, of the main transmission gear 10 is providd beside the driver's seat to control the manual valve 210.

The shift lever can be shifted to main speed ranges Mp, namely the P-range (parking), R-range (reverse), N-range (neutral), D-range (drive), S-range (second speed) and L-range (low speed). The position of the shift lever, namely, the main shift positions Mp, and the resultant operating condition of the clutches and the brakes for the fourth speed (4), the third speed (3), the second speed (2) and the first speed (1) are shown in Table 1.

In Table 1, in the columns for S1 and S2, "O" indicates energized state and "X" indicates de-energized state; in the column for S3, "Δ" indicated that the solenoid valve S3 is energized to produce the high-level solenoid pressure and "X" indicates that the solenoid valve S3 is de-energized to produce the low-level solenoid pressure; in the columns for one-way clutches, "L" indicates that the corresponding one-way clutch is engaged during an engine-drive mode while the driving power is transmitted through the clutch or the brake disposed in parallel to the one-way clutch, and hence the function of the one-way clutch is not necessarily essential (lock), "(L)" indicated that the corresponding one-way clutch is engaged in an engine-drive mode and is disengaged in an engine-braking mode, and "f" indicated that the corresponding one-way clutch is free.

TABLE 1

| Mp | | S1 | S2 | S3 | C1 | C2 | CO | B1 | B2 | B3 | BO | F1 | F2 | F3 |
|---|---|---|---|---|---|---|---|---|---|---|---|---|---|---|
| P | | O | X | X | X | X | E | X | X | X | X | f | f | f |
| R | | O | X | X | X | E | E | X | X | E | X | f | f | f |
| N | | O | X | X | X | X | E | X | X | X | X | f | f | f |
| D | 1 | O | X | X | E | X | E | X | X | X | X | f | L | (L) |
|   | 2 | O | O | Δ | E | X | E | X | E | X | X | L | f | (L) |
|   | 3 | X | O | Δ | E | E | E | X | E | X | X | f | f | (L) |
|   | 4 | X | X | Δ | E | E | X | X | E | X | E | f | f | f |
| S | 1 | O | X | X | E | X | E | X | X | X | X | f | L | (L) |
|   | 2 | O | O | Δ | E | S | E | E | E | X | X | (L) | f | (L) |
|   | 3 | X | O | Δ | E | E | E | X | E | X | X | f | f | (L) |
|   | (3) | X | X | X | E | E | E | X | E | X | X | f | f | (L) |
| L | 1 | O | X | X | E | X | E | X | X | E | X | f | (L) | (L) |
|   | 2 | O | O | X | E | X | E | E | E | X | X | (L) | f | (L)) |
|   | (1) | X | X | X | E | X | E | X | X | E | X | f | (L) | (L) |

Table 2 shows the relation between the range of the shift lever of the main transmission gear 10 and the connection of the lines 2, 3, 4, 5 and 6 to the line 1.

In Table 2, "O" indicates that the corresponding line is connected to the line 1, and hence the line pressure is supplied to the same, while "X" indicates the corresponding line is drained.

TABLE 2

|  | P | R | N | D | S | L |
|---|---|---|---|---|---|---|
| Line 2 | X | X | X | O | O | O |
| Line 3 | X | X | X | X | O | O |
| Line 4 | X | X | X | X | X | O |
| Line 5 | X | O | X | X | X | X |
| Line 6 | X | O | O | O | O | O |

The manual control of the manual valve 210 and the corresponding operation of the main hydraulic control unit 100 will be described hereinafter.

(1) Shift lever position: P-range or N-range.

As shown in Table 2, none of the lines 2 to 5 is connected to the line 1 and, as shown in Table 1, the first solenoid valve S1 is energized, while the second solenoid valve S2 is not energized. Consequently, the high-level solenoid pressure is applied to the spool 222 of the 1-2 shift valve 220 to set the spool 222 at the lower position; the spool 232 of the 2-3 shift valve 230 is moved to the upper position by the spring 231; the spool 242 of the 3-4 shift valve 240 is moved to the upper positions; and only the clutch CO connected through the 3-4 shift valve 240 the line 1F, the flow control valve 301 with check valve and the line 1E, not through the manual valve 210, to the line 1 is engaged.

(2) Shift lever position: D-range

As shown in Table 2, the line 2 is connected to the line 1 and the line pressure is supplied to the line 2, and thereby the clutch C1 is engaged.

At the start of the vehicle where the first speed is provided, as shown in Table 2, the first solenoid valve S1 is energized, the second solenoid valve S2 is not energized, the spool 222 of the 1-2 shift valve 220 is set at the lower position, the lines 3B and 2A connnected to the brakes B1 and B2 are drained, the line pressure is not supplied to the line 5C connected to the brake B3, hence the brakes B1, B2 and B3 are disengaged, the spool 232 of the 2-3 shift valve 230 is moved to the upper position to drain the line 1B, the clutch CO is disengaged, the line pressure is supplied through the line 1A to the bottom chamber 244 of the 3-4 shift valve 240 to move the spool 242 to the upper position, the line 1 is connected through the 3-4 shift valve 240 and the line 1F to the clutch CO to engage the clutch CO, the line 1B is drained to disengage the clutch C2, and the line pressure is supplied to the line 1F to drain the line 1D and to disengage the brake BO, and thereby the first speed is provided. When the running speed increased to a predetermined running speed, the electronic control unit 600 provides a signal to energize the second solenoid valve S2 so that the pressure in the top chamber 224 of the 1-2 shift valve 220 is changed to the low-level solenoid pressure. Consequently, the spool 222 of the 1-2 shift valve is moved to the upper position, the line pressure is supplied through the line 2, the 1-2 shift valve 220, the line 2A, the flow control valve 308 with check valve and the line 2B to the brake B2 to engage the brake B2, and thereby the transmission is caused to upshift to the second speed.

When the transmission is required to upshift to the third speed, the electronic control unit 600 gives a signel to de-energize the first solenoid valve S1. Consequently, the spool 232 of the 2-3 shift valve 230 is moved to the lower position, the line pressure is supplied to the servomechanism of the clutch C2 through the line 1, the 2-3 shift valve 230, the line 1B, the shuttle valve 302, the flow control valve 303 with check valve and the line 1P to engage the clutch C2, and the spool 222 of the 1-2 shift valve 220 is fixed at the upper position (position for speeds other than the first speed) by the line pressure supplied through the line 1C to the bottom chamber 223.

When the transmission is required to upshift to the fourth speed, the electronic control unit 600 gives a signal to de-energize the second solenoid valve S2. Consequently, the solenoid pressure supplied to the top chamber 243 of the 3-4 shift valve 240 through the line 1H is reduced to the low level solenoid pressure, the spool 242 of the 3-4 shift valve 240 is moved to the lower position, the line 1F is drained, the line pressure is supplied to the line 1D, the line pressure is supplied through the flow control valve 305 with check valve to the line 1G, and thereby the clutch CO is disengaged and the brake Bo is engaged.

(3) Shift lever position: S-range.

As shown in Table 2, the line pressure is supplied to both the lines 2 and 3. The manner of upshift from the first speed through the second speed to the third speed is the same as that of upshift when the shift lever is positioned in the D-range. However, since the line pressure is supplied through the line 1 or 3, the 2-3 shift valve 230 and the line 1A to the bottom chamber of the 3-4 shift valve 240 to move the spool 242 to the upper position, upshift to the fourth speed is inhibited. In the second speed, similarly to the second speed with the shift lever positioned in the D-range, the line pressure is supplied to the servomechanism of the clutches CO and C1 and the brake B2 and to the intermediate coasting modulator valve 245 through the line 3, the 2-3 shift valve 230, the line 3A, the 1-2 shift valve 220 and the line 3D. Consequently, a pressure regulated by the intermediate coasting modulator valve 245 is supplied to the line 3B to engage the brake B1 to provide the second speed, where both the brakes B1 and B2 are always engaged. In the second speed with the shift lever shifted to the S-range, engine brake is effective during coasting and the transmission torque capacity is increased.

When the shift lever is shifted from the D-range to the S-range while the vehicle is running at the fourth speed with the shift lever positioned in the D-range, the line pressure is supplied to the bottom chamber 244 of the 3-4 shift valve 240, and thereby downshift from the fourth speed to the third speed is achieved immediately.

(4) Shift lever position: L-range.

As shown in Table 2, the line pressure is supplied to the lines 2, 3 and 4. The manner of upshift from the first speed to the second speed is the same as that of upshift when the shift lever is positioned in the D-range. However, since the line pressure is supplied through the line 4 to the bottom chamber 233 of the 2-3 shift valve 230 to fix the spool 232 at the upper position, upshift to the thrid speed is inhibited. When the first speed is provided, the fluid is supplied to the servomechanism of the brake Be through the line 4, the 2-3 shift valve 230, the line 4A, the low coasting modulator valve 250, the line 4B, the 1-2 shift valve 220 and the line 5C to engage the brake B3, and hence engine brake is effective. When the second speed is provided, the condition is the same as that when the shift lever is shifted to the S-range. When the shift lever is shifted to the L-range while the vehicle is running at the third speed, the line pressure is introduced into the bottom chamber 233 of the 2-3 shift valve 230, and thereby downshift to the second speed is achieved immediately. After the running speed has been reduced to an expected running speed, the electronic control unit 600 provides a signal to energize the second solenoid valve S2 to downshift from the second speed to the first speed.

(5) Shift lever position: R-range.

As shown in Table 2, the lines 2, 3 and 4 are drained and the line pressure is supplied to the line 5. Since the line pressure is not supplied to the lines 2 and 3 connected to the servomechanisms of the clutch C1 and the brakes B1 and B2, the clutch C1 and the brakes B1 and B2 are disengaged. The line pressure is supplied to the servomechanism of the clutch C2 through the line 5, the shuttle valve 302, the flow control valve 303 with check valve and the line 1P to engage the cultch C2. Since the line pressure is supplied to the bottom chamber 223 of the 1-2 shift valve 220 through the line 1C, the spool 222 is moved to the upper position, and hence the line pressure is supplied to the line 5C, so that the brake B3 is engaged. Since the first solenoid valve S1 is energized, the low-lever solenoid pressure prevails in the tom chamber 243 of the 2-3 shift valve 240, and hence the spool 232 is moved to the upper position. The line pressure is supplied through the line 1, the 2-3 shift valve 230 and the line 1A to the bottom chamber 244 of the 3-4 shift valve 240 to move the spool 242 to the upper position, and thereby the line pressure is supplied through the line 1, the 3-4 shift valve 240 and the line 1F to the servomechanism of the clutch CO to engage the clutch CO. Since the line 1D associated with the brake BO is drained, the brake BO is disengaged and the reverse is provided.

When the shift lever isa positioned in the D-range or the S-range, the line pressure is supplied to the line 2, and the spool 222 of the 1-2 shift valve 220 is moved to the upper position (position for speeds other than the first speed), the line pressure is supplied to the top chamber 121 of the lockup relay valve 120 through the lines 1A and 2D. In this state, when the third solenoid valve S3 is energized and the high-level solenoid pressure is supplied to the top chamber 121, the spool 122 of the lockup relay valve 120 is moved to the lower position to connect the lines 1Q and 6B. Consequently, the direct coupling clutch 16 of the torque converter T is engaged to establish the direct coupling state of the torque converter T. When the line pressure is not supplied to the line 2A or when the line pressure is supplied to the line 2A and the third solenoid valve S3 is not energized to supply the low-level solenoid pressure to the top chamber 121 of the lockup relay valve 120, the spool 122 is moved to the upper position by the line pressure supplied to the bottom chamber 124 through the line 1. While the spool 122 is positioned at the upper position, the line 1Q communicates with the line 1R, and hence the direct coupling clutch 16 of the torque converter T is disengaged. The secondary line pressure (torque converter pressure) supplied from the torque converter T to the line 1S while the spool 122 is positioned at the upper position, namely, in a state other than the lockup state, is supplied through the lockup relay valve 120 and the line 1T to the oil cooler O/C and through the line 1, the orifice 126 formed in the sleeve 125 of the lockup relay valve 120 and lines 1U and 1T to the oil cooler O/C.

Figure 4:
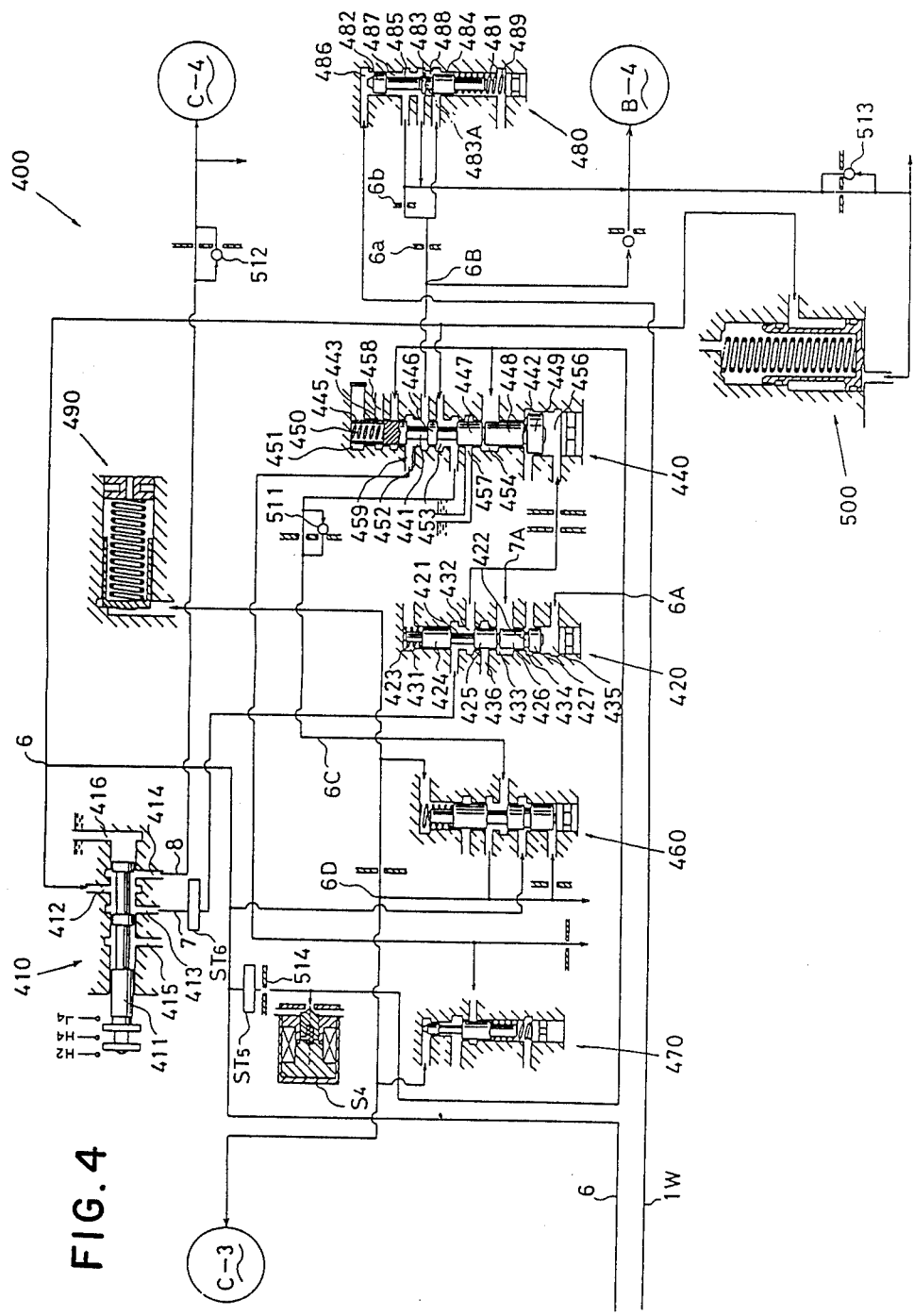
FIG. 4 is a hydraulic circuit diagram of a hydraulic control system for a transfer gear.

FIG. 4 shows the auxiliary hydraulic control unit 400 of the transfer gear 50.

The auxiliary hydraulic control unit 400 comprises a transfer manual valve 410 for supplying the fluid supplied thereto through the line 6 of the main hydraulic control unit 100 of the main transmission gear 10 to the lines 7 and 8 when operated by a shift lever provided beside the driver's seat, a relay valve 420, an inhibitor valve 440 for controlling the clutch C3 and the brake B4, a third accumulator control valve 460, a shift timing control valve 470, an orifice control valve 480 for smoothly engaging the brake B4, an accumulator 490 for smoothly engaging the clutch C3, an accumulator 500 for smoothly engaging the brake B4, the respective hydraulic servomechanisms C-3, C-4 and B-4 of the clutches C3 and C4 and the brake B4, flow control valves 511, 512 and 513 with check valve for controlling the flow rate of the fluid, oil strainers ST5 and ST6, a fourth solenoid valve S4 which is controlled by the electronic control unit 600, which will be described afterward, and lines interconnecting the valves and the hydraulic cylinders of the clutches and brake.

The transfer manual valve 410 has a spool 411 interlocked with a transfer shift lever, not shown, provided beside the driver's seat, an inlet port 412 connected to the line 6 of the main hydraulic control unit 100, an outlet port 414 connected to the line 8 and drain ports 415 and 416. When the spool 411 of the transfer manual valve 410 is shifted to a position corresponding to the high-speed two-wheel drive position (H2), the lines 6 and 7 are connected and the line 8 is connected to the drain port 416. When the spool 411 is shifted to a position corresponding to the high-speed four-wheel drive position (H4), the lines 6 and 7 are connected to the line 8, and when the spool 411 is shifted to the low-speed four-wheel drive position (L4), the lines 6 and 8 are connected and the line 7 is connected to the drain port 415.

The relay valve 420 has a spool 421 having top and bottom lands 424 and 425 having the same diameter, a plunger 422 extended coaxially with the spool 421, and a spring 423 abutting on the top land 424. The plunger 422 has a top land 426 having the same diameter as that of the spool 421, and a bottom land 427 having a diameter greater than that of the lands of the spool 421. A top chamber 431, a first intermediate chamber 432, a second intermediate chamber 433 and a bottom chamber 435 are defined by the top land 424 of the spool 421, by the top land 424 and the bottom land 425 of the spool 421, by the bottom land 425 of the spool 421 and the top land 426 of the plunger 422, by the top land 426 and the bottom land 427 of the plunger 422, and by the bottom land 427 of the plunger, respectively.

When a fluid pressure is supplied through the line 6A to the bottom chamber 435 of the relay valve 420, the plunger 422 is moved to the upper position, and thereby the line 7 communicates with the line pressure supply line 7A by means of the first intermediate chamber 432 to enable to supply the line pressure to the bottom chamber 456 of the inhibitor valve 440 or to drain the bottom chamber 456 of the inhibitor valve 440 according to the position of the spool 411 of the transfer manual valve 410. When the line 7 is connected to the line pressure supply line 7A and the transfer manual valve 410 is set so as to supply the line pressure to the bottom chamber 456 of the inhibitor valve 440, the feedback pressure is supplied to the second chamber 456. Consequently, the spool 421 is fixed at the upper position and, when the electronic control unit 600 provides a signal to energize the solenoid valve S4 at this time to drain the bottom chamber 435, the plunger 422 is moved to the lower position, while the spool 421 remains fixed at the upper position, and thereby the line pressure is supplied continuously to the bottom chamber 456 of the inhibitor valve 440. In this state, when the transfer manual valve 410 is controlled to drain the line 7, or when the line 7 is connected to the line pressure supply line 7A, the bottom chamber 456 of the inhibitor valve 440 is drained and the electronic control unit 600 provides a signal to energize the fourth solenoid valve S4 to drain the bottom chamber 435, both the spool 421 the plunger 422 are moved to the lower position by the spring 423 and the line 7A communicates with the drain port 436 by means of the first intermediate chamber 432. While the spool 421 is positioned at the lower position, the transfer manual valve 410 is unable to supply the line pressure to the bottom chamber 456 of the inhibitor valve 440 and the bottom chamber 456 of the inhibitor valve 440 remains drained. Consequently, the spool 441 of the inhibitor valve 440 is positioned at the lower position.

The inhibitor valve 440 has the spool 441 which is moved to a first position (lower position, as viewed in FIG. 4) or to a second position (upper position, as viewed in FIG. 4) to supply the line pressure to the hydraulic servomechanism C-3 of the clutch C3 and the hydraulic servomechanism B-4 of the brake B4 or to drain the hydraulic servomechanisms C-3 and B-4, and a plunger 442 which is disposed coaxially with the spool 441 and is moved to a first position (lower position, as viewed in FIG. 4) or to a second position (upper position, as viewed in FIG. 4). When the plunger 442 is moved to the second position (upper position), the spool 441 is moved to the second position. The spool 441 has a hollow top land 445, an intermediate land 446 and a bottom land 447 having the same diameter. A spring 450 abuts on the top land 445 to urge the spool 441 toward the first position. The plunger 442 has a top land 448 having the same diameter as that of the lands of the spool 441, and a bottom land 449 having a diameter greater than that of the top land 448. These lands of the spool 441 and the plunger 442 define, from the top to the bottom, a top chamber 451, a first intermediate chamber 452, a second intermediate chamber 453, a chamber 454 and a bottom chamber 456.

When the spool 441 of the inhibitor valve 440 is positioned at the lower position, the top chamber 451 communicates with the line 6A by means of a port 443 formed in the hollow top land 445, the first intermediate chamber 452 interconnects the line pressure supply line 6 and the deceleration line 6B, and the second intermediate chamber 453 interconnects the direct coupling line 6C and the drain port 457. When the spool 441 is positioned at the upper position, the top chamber communicates with the drain port 458 by means of the port 443 of the hollow top land 445, the first intermediate chamber 452 interconnects the deceleration line 6B and the drain port 459, and the second intermediate chamber 453 interconnects the line 6 and the direct coupling line 6C. The chamber 454 always communicates with the line 6A which supplies a fluid pressure controlled by the fourth solenoid valve S4 to urge the plunger 442 toward the first position (lower position) and the spool 441 toward the second position (upper position). The bottom chamber 456 is always pressurized to urge the plunger 442 toward the second position (upper position).

The orifice control valve 480 regulates the pressure of the fluid supplied thereto through the line 6B and supplies the fluid of a regulated pressure to the hydraulic servomechanism B-4 of the brake B4. The orifice control valve 480 has a spool 485 having a top land 482, an intermediate land 483 and a bottom land 484, a top chamber 486 defined by the top land 482, a first intermediate chamber 487 defined by the top land 482 and the intermediate land 483, a second intermediate chamber 488 defined by the intermediate land 483 and the bottom land 484, a bottom chamber 489 defined by the bottom land 484, a spring 481 accommodated in the bottom chamber 489, and an orifice 483A formed in the second intermediate chamber 488.

The top chamber 486 is connected to the line 1W of the main hydraulic control unit 100. The position of the spool 485 is dependent on the fluid pressure corresponding to the degree of opening of the throttle and the spring force of the spring 481. The line pressure supplied to the line 6B is supplied selectively through an orifice 6a or 6b provided in the line 6B to the hydraulic servomechanism B-4.

The fourth solenoid valve S4 is energized when the transfer shift lever, not shown, is shifted to the L-4-range (low-speed four-wheel drive range) and the running condition of the vehicle meets predetermined conditions. The fourth solenoid valve S4 is de-energized when the transfer shift lever is shifted to the H2-range (two-wheel drive range) or the H4-range (high-speed four-wheel drive range) and the running condition of the vehicle meets predetermined conditions. The fourth solenoid valve S4 is thus controlled by the electronic control unit 600 according to the running condition of the vehicle. When the fourth solenoid valve S4 is not energized, a high-level solenoid pressure equal to the line pressure is produced in the line 6A communicating with the line 2 through an orifice 514 and, when the fourth solenoid valve S4 is energized, the line 6A is drained and a low-level solenoid pressure is produced.

The transfer shift lever of the transfer gear 50 is provided beside the driver's seat for operating the transfer manual valve 410. The transfer shift lever has auxiliary shift positions Sp for the H2-range (high-speed two-wheel drive range), the H4-range (high-speed four-wheel drive range) and the L4-range (low-speed four-wheel drive range). The positions Sp of the transfer shift lever and the resultant conditions of the brake B4 and the clutches C3 and C4 in relation to the running condition of the vehicle are shown in Table 3.

TABLE 3

| Sp | S4 | C3 | B4 | C4 | Running condition |
|---|---|---|---|---|---|
| H2 | O | X | E | X | L2 |
|  | α | E | X | X | H2 |
| H4 | O | X | E | E | L4 |

TABLE 3-continued

| Sp | S4 | C3 | B4 | C4 | Running condition |
|---|---|---|---|---|---|
|  | α | E | X | E | H4 |
| L4 | X | E | X | E | H4 |
|  | β | X | E | E | L4 |

TABLE 4

|  | H2 | H4 | L4 |
|---|---|---|---|
| Line 7 | O | O | X |
| Line 8 | X | O | O |

In Table 3, "α" indicates that once the solenoid valve S4 is de-energized, the high-speed running state is maintanined even if the solenoid valve S4 is enrgized, and "β" indicates that once the solenoid valve S4 is energized, the low-speed running state is maintained if the solenoid valve S4 is de-energized. "E" indicates the engagement of the corresponding clutch or brake, and "X" indicates the disengagement of the corresponding clutch or brake.

The shift range of the transfer gear and the result connection of the lines 7 and 8 to the line 6 are shown in Table 4.

In the Table 4, "O" indicates that the corresponding line is connected to the line 6 and the line pressure is supplied thereto, and "X" indicates that the corresponding line is drained.

The manner of operation of the transfer gear 50 for the shift ranges will be described hereinafter.

(A) Transfer shift lever position: H2-range.

As shown in Table 4, the line pressure is supplied to the line 7, while the line 8 is drained. Consequently, the hydraulic servomechanim C-4 is drained, and hence the clutch C4 is disengaged. Therefore, the power is not transmitted to the sleeve 53, and hence the two-wheel drive mode is provided.

While the electronic control unit 600 keeps the fourth solenoid valve S4 de-energized, the high-level solenoid pressure is supplied to the bottom chamber 435 of the relay valve 420, and thereby the spool 421 and the plunger 422 are moved to the upper position, the line 7 communicates with the line pressure supply line 7A by means of the relay valve 420, and the line pressure is supplied to the bottom chamber 456 of the inhibitor valve 440. Accordingly, the spool 441 and the plunger 442 of the inhibitor valve 440 are moved to the second position (upper position, as viewed in FIG. 4), the line 6B is drained through the drain port 459, and the hydraulic servomechanism B-4 is drained to disengage the brake B4. Since the spool 441 and the plunger 442 of the inhibitor valve 440 are moved to the second position (upper position), the line 6C is connected to the line 6 and communicates with the line 6D by means of the third accumulator control valve 460, so that the line pressure is supplied to the hydraulic servomechanism C-3 to engage the clutch C3. Consequently, the transfer gear 50 is in the H2 mode (high-speed two-wheel drive mode).

At this time, since a feedback pressure is supplied through the line pressure supply line 7A to the second intermediate chamber 433 of the relay valve 420, the spool 421 of the relay valve 420 is fixed at the upper position. Accordingly, if the fourth solenoid valve S4 is energized to supply the low-level solenoid pressure to the bottom chamber 435 of the relay valve 420, only the plunger 422 is moved to the lower position, whereas the spool 421 is held at the upper position, and hence the line pressure is supplied to the bottom chamber 456 of the inhibitor valve 440. Consequently, the transfer gear 50 is held in the H2 mode (high-speed two-wheel drive) even if the fourth solenoid valve S4 is energized.

(B) Transfer shift lever position: H4-range.

As shown in Table 4, the line pressure is supplied to both the lines 7 and 8.

Since the high-level solenoid pressure is supplied to the bottom chamber 435 of the relay valve 420 while the fourth solenoid valve S4 is not energized under the control of the electronic control unit 600, the spool 421 and the plunger 422 are moved to the upper position, the line 7 is connected to the line pressure supply line 7A, and the line pressure is supplied to the bottom chamber 456 of the inhibitor valve 440. Therefore, the spool 441 and the plunger 442 of the inhibitor valve 440 are moved to the second position (upper position), the line 6B is drained through the drain port 459, and the hydraulic servomechanism B-4 is drained to disengage the brake B4. Since the spool 441 and the plunger 442 of the inhibitor valve 440 are held at the second position (upper position), the line 6C is connected to the line 6 and communicates with the line 6D by means of the third accummulator control valve 460, so that the line pressure is supplied to the hydraulic servomechanism C-3 to engage the clutch C3. The line pressure is supplied also to the hydraulic servomechanism C-4 through the line 8 to engage the clutch C4. Consequently, the transfer gear 50 is in the H4 mode (high-speed four-wheel drive mode).

In this state, since the feedback pressure is supplied through the line pressure supply line 7A to the second intermediate chamber 433 of the relay valve 420, the spool 421 of the relay valve 420 is fixed at the upper position. Therefore, if the fourth solenoid valve S4 is energized to supply the low-level solenoid pressure to the bottom chamber 435, only the plunger 422 is moved to the lower position, whereas the spool 421 is held at the upper position to supply the line pressure to the bottom chamber 456 of the inhibitor valve 440. Accordingly, the transfer gear 50 is held in the H4 mode (high-speed four-wheel drive mode).

(C) Transfer shift lever position: L4-range.

As shown in Table 4, the line 7 is drained and the line pressure is supplied to the line 8. Therefore, the line 7 and 7A are drained regardless of the condition of the relay valve 420 and the clutch C4 is engaged by the line pressure supplied through the line 8. Accordingly, the transfer gear 50 is held in the four-wheel drive mode.

When the transfer shift lever is shifted from the H2-range or the H4-range to the L4-range and the fourth solenoid valve S4 is not energized under the control of the electronic control unit 600, the high-level solenoid pressure is supplied through the line 6A to the chamber 454 of the inhibitor valve 440 and the bottom chamber 456 is drained through the line 7A, the relay valve 420, the line 7 and the transfer manual valve 410. Consequently, the line pressure supplied to the chamber 454 moves the plunger 442 of the inhibitor valve 440 to the first position (lower position), whereas the spool 441 of the inhibitor valve 440 is held at the second position (upper position). Consequently, the transfer gear 50 is held in the H4 mode (high-speed four-wheel drive mode).

When the electronic control unit 600 provides a signal to energize the fourth solenoid valve S4 while the transfer shift lever is in the L4-range or when the transfer shift lever is shifted to the L4-range while the fourth solenoid valve S4 is energized, the low-level solenoid pressure is supplied to the line 6A, and thereby the spool 441 of the inhibitor valve 440 is moved to the first position (lower position) by the spring 45. Consequently, the line 6 communicates with the line 6B by means of the inhibitor valve 440, and then the line pressure is supplied through the orifice 6a and the orifice 6b or the orifice control valve 480 to the hydraulic servomechanism B-4 of the brake B4, the line 6C is drained through the first intermediate chamber 452 and the drain port 457 of the inhibitor valve 440, and thereby the hydraulic servomechanism C-3 of the clutch C3 is drained. Consequently, the mode of the transfer gear 40 is changed to L4 mode (low-speed four-wheel drive mode). Once the L4 mode is provided, since the high-level solenoid pressure is supplied to the top chamber 451 through the port 443 of the hollow land 445 of the spool 441 at the moment when the high-level solenoid pressure is supplied to the line 6A, the spool 441 is held as it is even if the fourth solenoid valve S4 is de-energized. Thus, the transfer gear 50 is held in the L4 mode (los-speed forur-wheel drive mode).

(D) Transfer shift lever shifting from the L4-range to the H2-range or H4-range.

While the fourth solenoid valve S4 is energized under the control of the electronic control unit 600, the bottom chamber 435 of the relay valve 420 is drained and the spool 421 and the plunger 423 are moved to the lower position by the spring 423, and hence the lines 7 and 7A are disconnected by the top land 424 and the bottom chamber 456 of the inhibitor valve 440 is drained. Accordingly, the spool 441 and the plunger 442 of the inhibitor valve 440 is moved to the lower position by the spring 450, the clutch C3 is disengaged and the brake B4 is engaged. Consequently, the transfer gear 50 is in the L2 mode (low-speed two-wheel drive mode) or the L4 mode (low-speed four-wheel drive mode). However, when the electronic control unit 600 provides a signal to de-energize the fourth solenoid valve S4, the high-level solenoid pressure is supplied to the bottom chamber 435 of the relay valve 420. Consequently, the spool 421 and the plunger 422 are moved to the upper position, the line 7 and the line pressure supply line 7A are connected, the line pressure is supplied to the bottom chamber 456 of the inhibitor valve 440, and the spool 441 and the plunger 442 of the inhibitor valve 440 are moved to the second position (upper position). Accordingly, the line 6B is drained through the drain port 459 to disengage the brake B4, and the spool 441 and the plunger 442 of the inhibitor valve 440 are moved to the second position (upper position), and thereby the line 6C is connected to the line 6, and hence the line pressure is supplied through the third accumulator control valve 460 and the line 6D to the hydraulic servomechanism C-3 to engage the clutch C3. Thus, the transfer gear 50 is shifted to the H2 mode (high-speed two-weel drive mode) or to the H4 mode (high-speed four-wheel drive mode).

Figure 5:
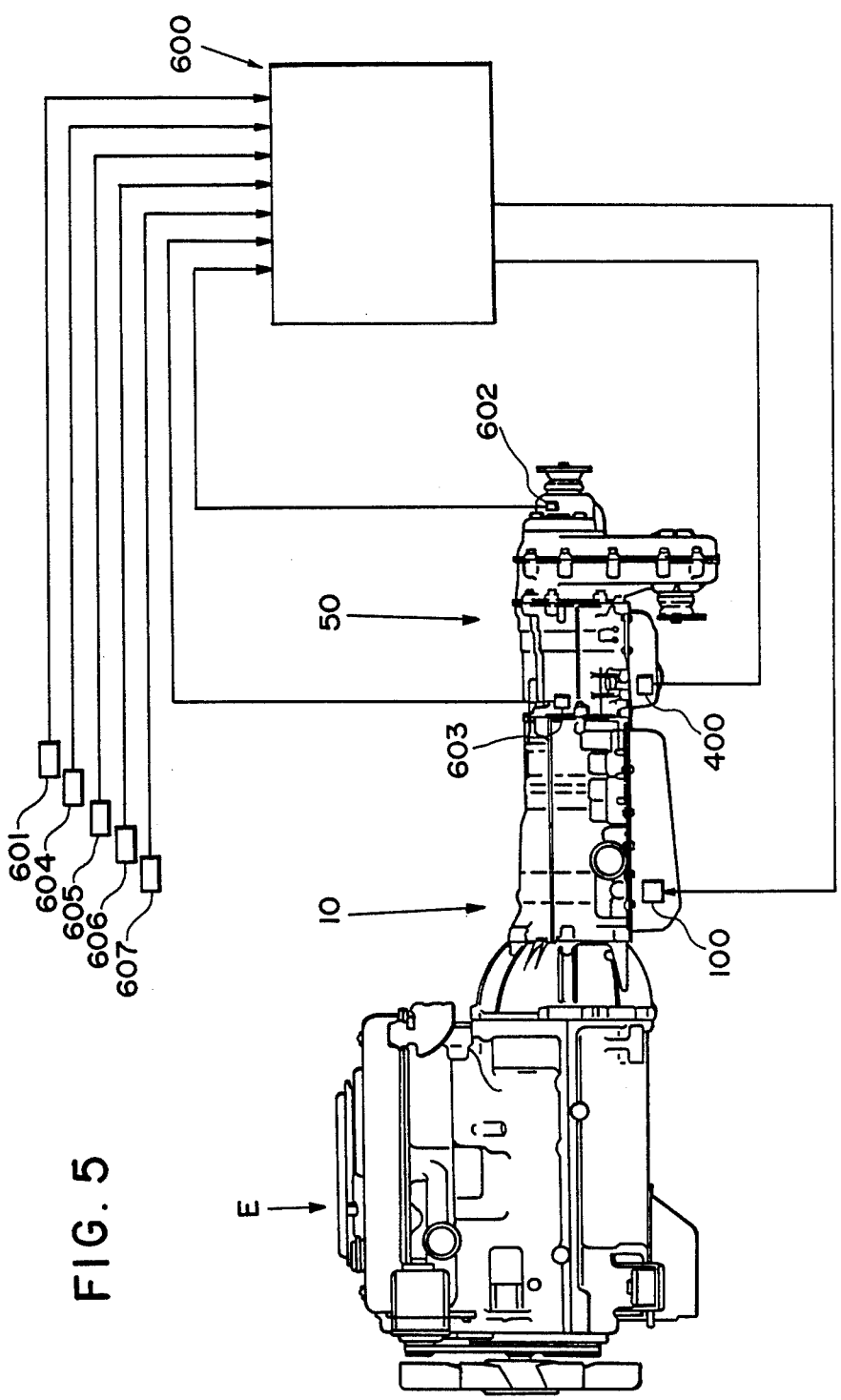
FIGS. 5 and 6 are block diagrams of an electronic control unit.
Figure 6:
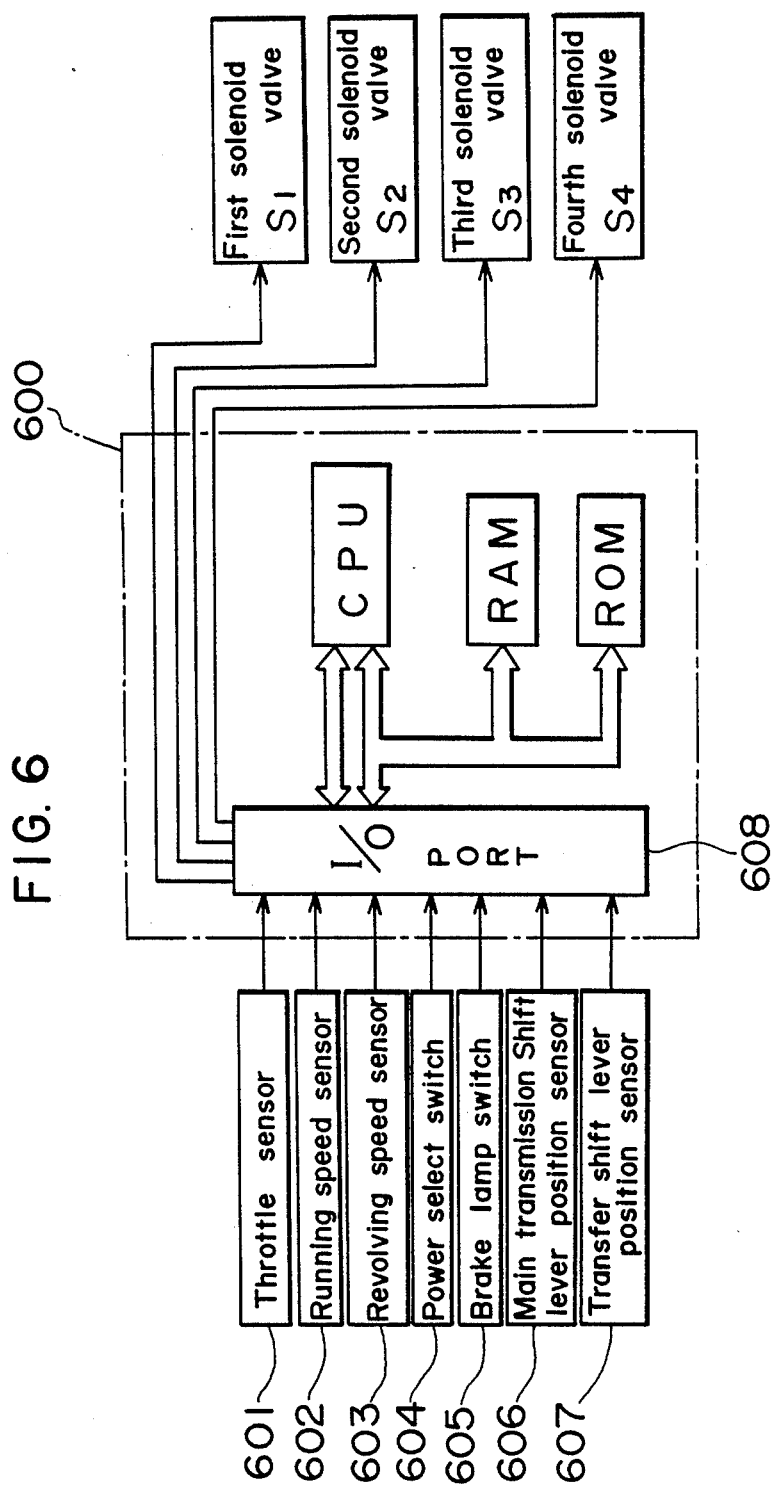

FIGS. 5 and 6 are block diagrams of the electronic control unit for controlling the solenoid valves S1 to S4 of the main hydraulic control unit 100 and the auxiliary hydraulic control unit 400.

The electronic control unit 600 comprises a throttle sensor 601 for detecting the degree of opening of the throttle valve, a running speed sensor 602 for detecting the revolving speed of the output shaft of the transfer gear 50 and for providing a running speed signal corresponding to the revolving speed of the output shaft of the transfer gear 50, a revolving speed sensor 603 for detecting the revolving speed of the output shaft 32 of the main transmission gear 10, namely, the input shaft of the transfer gear 50, a power select switch (PS) 604 for manually selecting a desired transmission pattern among an economy transmission pattern (E-pattern), a normal transmission pattern (N=pattern) and a power transmission pattern (P-pattern), a brake lamp switch 605, a main transmission shift lever position sensor 606 for detecting the present shift postion Mp of the main transmission shift lever, a transfer shift lever position sensor 607 for detecting the present position Sp of the transfer shift lever of the transfer gear 50, and I/O port 608 for receiving signals from those sensors and giving signals to the solenoid valve S1 to S4, a central processing unit CPU, a random access memory RAM for deciding a speed change point, and a read-only memory ROM storing speed change pattern data such as speed change points and lockup points.

Figure 7:
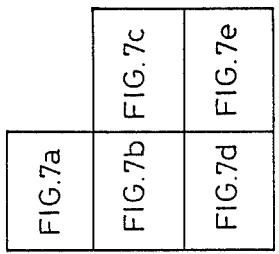
FIG. 7 is a flow chart showing a shift control routine.
Figure 7A:
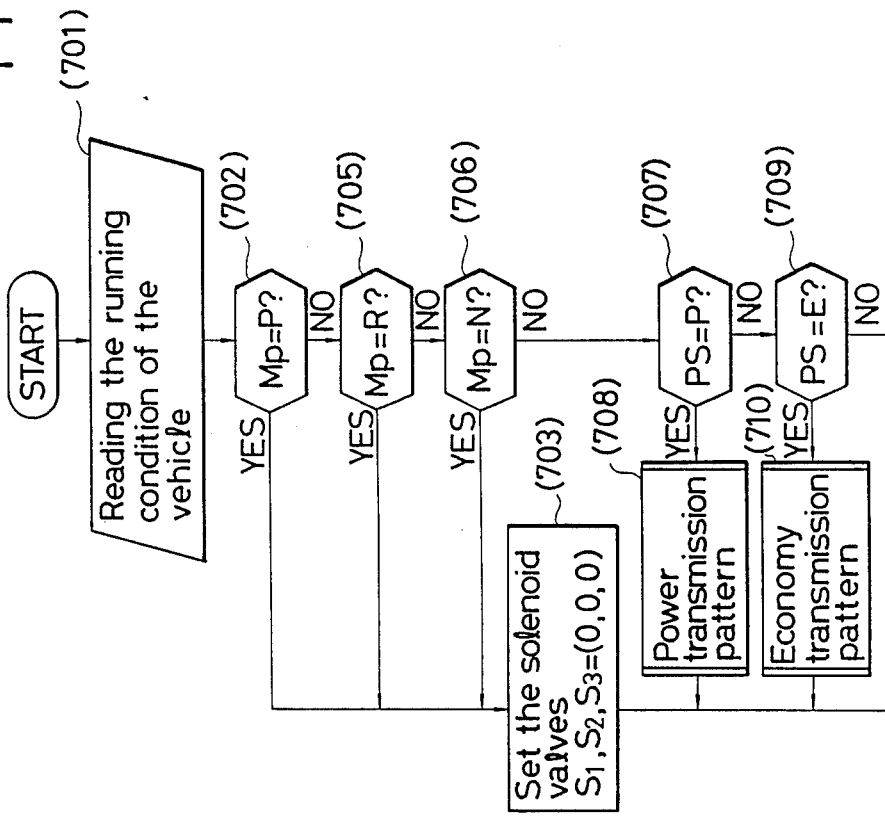
Figure 7C:
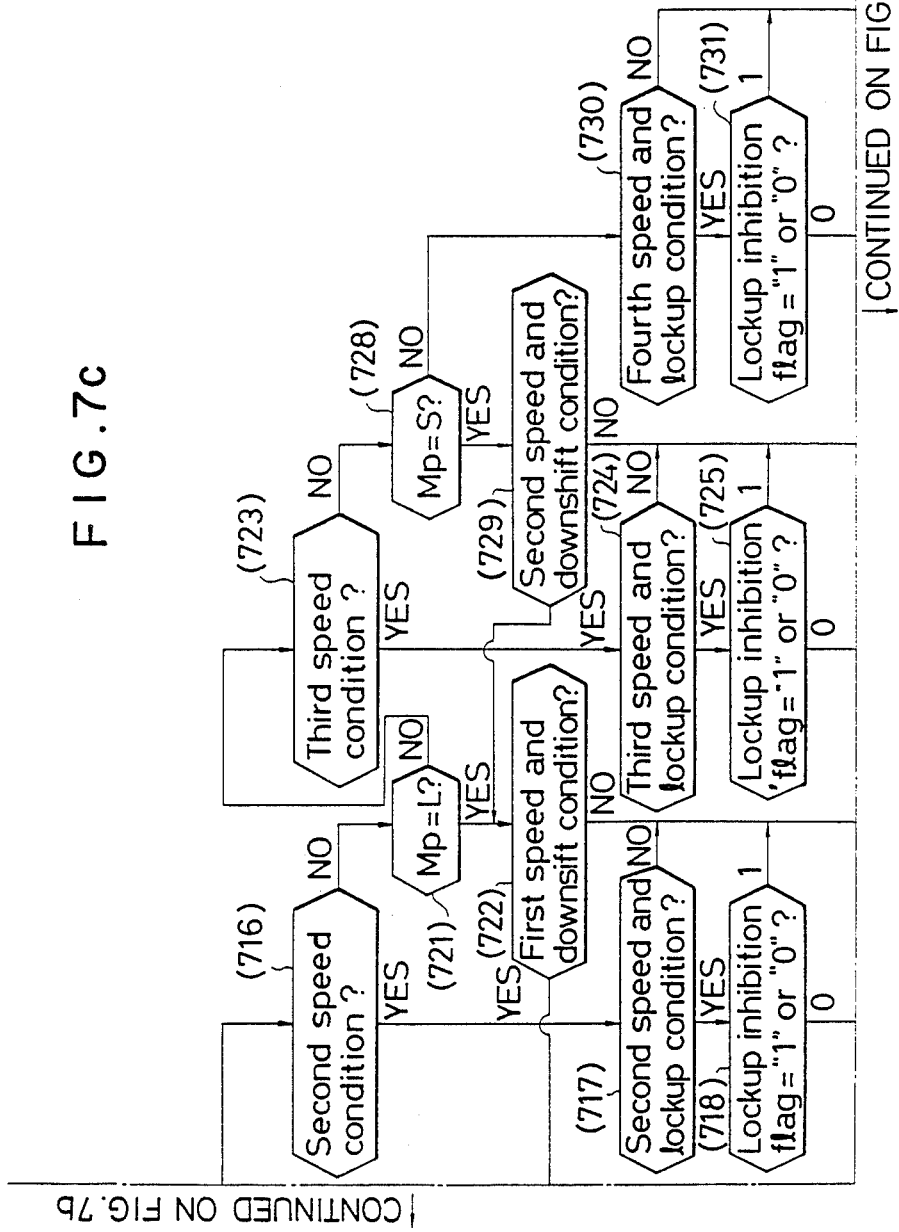
Figure 7D:
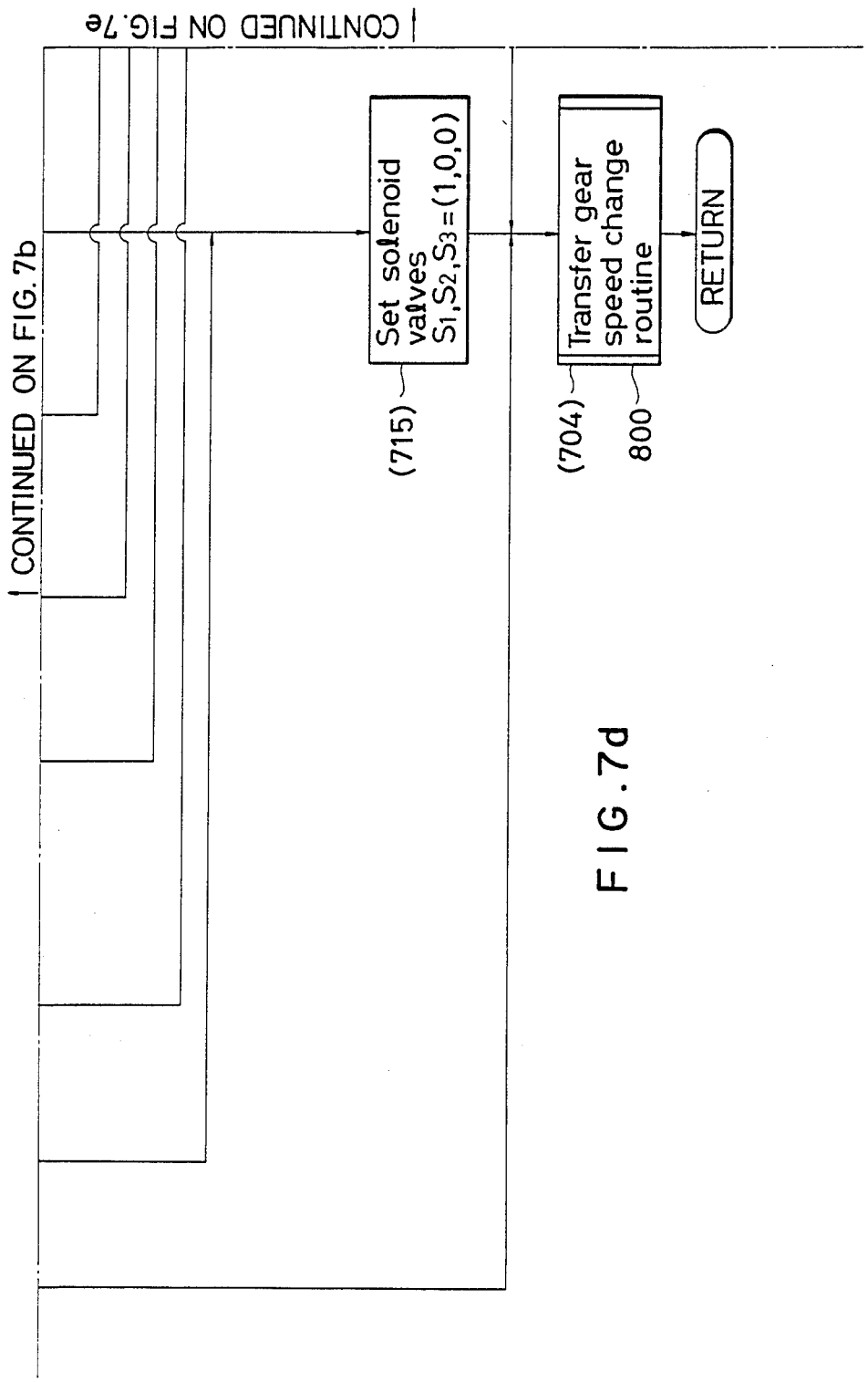
Figure 7E:
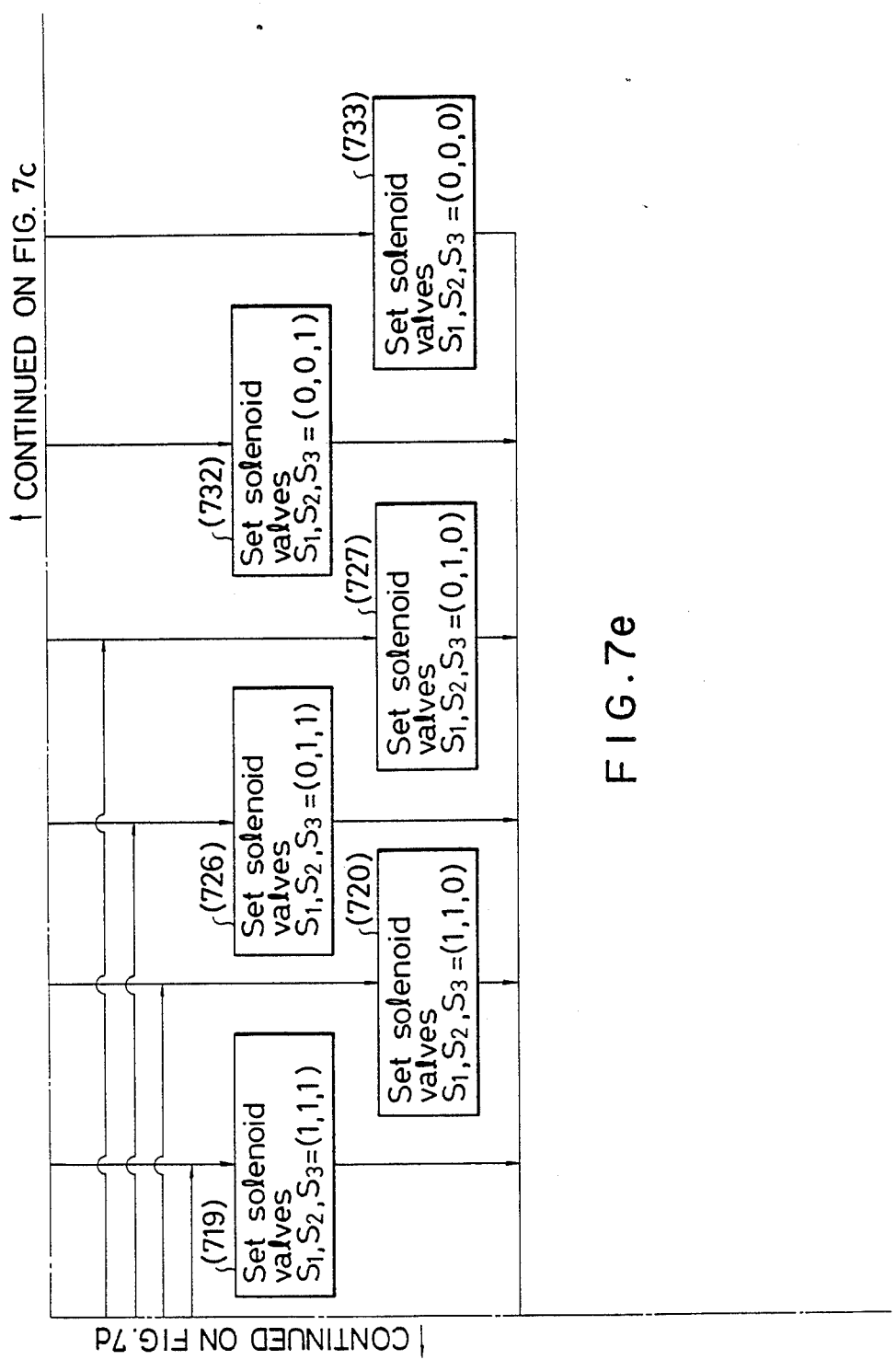

The manner of speed change control will be described with reference to a flow chart shown in FIG. 7.

The engine E is started by switching on the ignition switch, not shown, of the vehicle. The operating conditions of the vehicle is read (701) from the signals provided by the throttle sensor 601, the running speed sensor 602, the revolving speed sensor 603, the power select switch 604 (hereinafter referred to as "PS"), the brake lamp switch 605, the main transmission shift lever position sensor 606 and the transfer shift lever position sensor 607. Decision is made as to whether or not the present shift position Mp of the main transmission gear 10 is the P-range (parking range) 702. When YES (Mp=P-range), an output signal to de-energize (indication: 0) the solenoid valves S1, S2 and S3 is provided (703), and then the operation advances to Step 704 and, when NO (Mp≠P-range), decision is made as to whether or not the shift position Mp is the R-range (reverse) (705). When YES (Mp=R-range), the operation advances to Step 703 and, when NO(Mp=R-range), decision is made as to whether or not the shift position Mp is the N-range (neutral) (706). When YES (Mp=N-range), decision is made as to whether or not the PS is set for the P-pattern (707). When YES (P-pattern), speed change operation is controlled according to the P-pattern in which high speed-change points are provided (708), and then the operation goes to Step 704 and, when NO (not P-pattern), decision is made as to whether or not the PS is set for the E-pattern (709). When YES (E-pattern), speed change operation is controlled according to the E-pattern in which low speed-change points are provided (701), and then the operation goes to Step 704 and, when NO (not E-pattern, but N-pattern), decision is made as to whether or not the brake lamp switch 605 is ON (711). When YES (brake lamp switch is ON), normal brake lamp On running is carried out (712), and when the operation goes to Step 704 and, when NO (brake lamp switch is OFF), in this embodiment, decision is made as to whether or not the fourth solenoid valve S4 is energized (713) to decide the condition of the transfer gear 50 (when the fourth solenoid valve S4 is energized -indication: "1"-, the transfer gear 50 is in the low-speed mode and, when not -indication: "0"-, the transfer gear 50 is in the high-speed mode). When the indication is "0" (the fourth solenoid valve S4 is not energized), decision is made as th whether or not the running condition of the vehicle corresponds to the first speed with the PS set for the N-pattern and the transfer gear 50 set in the high-speed mode (714), When YES (the first speed), an output signal is provided (715) to energize the solenoid valve S1 ("1") and to de-energize the solenoid valves S2 and S3, and then the operation goes to Step 704, and, when NO (a speed other than the first speed), decision is made as to whether or not the running condition of the vehicle corresponds to the second speed with the PS set for the N-pattern and the transfer gear 50 set in the high-speed mode (716). When YES (the second speed), decision is made as to whether or not the running condition of the vehicle corresponds to the second speed with the direct coupling clutch engaged at the lockup point of the transfer gear 50 for the high-speed mode and the PS set for the N-pattern (717). When YES (the second speed and the high-speed mode), decision is made if the lockup inhibition flag is "0" (not placed) or "1" (placed) (718). When "0" (not placed), an output signal is provided to energize the solenoid valves S1, S2 and S3 (719) and, when "1" (placed), an output signal is provided to energize the solenoid valves S1 and S2 and to de-energize the solenoid valve S3 (720), and then the operation goes to Step 704. When the decision at Step 717 is NO (a mode other than the second speed and high-speed mode), the operation goes to Step 720. When the decision at Step 716 is NO (a speed other than the second speed), decision is made as to whether or not the shift position Mp is L-range (721). When YES (Mp=L-range), decision is made as to whether or not downshift to the first speed is necessary (722). When YES (downshift to the first speed), the operation goes to Step 715 and, when the decision at Step 722 is NO (the first speed is not necessary), the operation goes to Step 720. When the decision at Step 721 is NO (Mp≠L-range), decision is made as to whether or not the running condition of the vehicle corresponds to the third speed with the PS set for the N-pattern and the transfer gear 50 set in the high-speed mode (723). When YES (the third speed), decision is made as to whether or not the running condition of the vehicle corresponds to the third speed of the high-speed mode at the lockup point with the PS set for the N-pattern and the transfer gear 50 set in the high-speed mode (724). When YES (the third speed of the high-speed mode), decision is made if the lockup inhibition flag is "0" or "1" (725). When "0" (the lockup inhibition flag is not placed), an output signal is provided to energize the solenoid valves S2 and S3 and to de-energize the solenoid valve S1 (726). When the decision at Step 725 si "1" (the lockup inhibition flag is placed), an output signal is provided to energize the solenoid valve S2 and to de-energize the solenoid valves S1 and S3 (727), and then the operation goes to Step 704. When the decision at Step 724 is NO (a speed other than the third speed of the high-speed mode), the operation goes to Step 727. When the decision at Step 723 is NO (a speed other than the third speed), decision is made as to whether or not the shift position Mp is the S-range (second range) (728). When YES (Mp=S-range), decision is made as to whether or not downshift to the second speed is necessary (729). When YES (downshift to the second speed is necessary), the operation goes to Step 722 and, when NO (a condition other than that requiring downshift to the second speed), the operation goes to Step 727. Whe the decision at Step 728 is NO (Mp≠S-range), that is, the running condition of the vehicle corresponds to the fourth speed, decision is made as to whether or not the running condition of the vehicle corresponds to the fourth speed at the lockup point with the PS set for the N-pattern and the transfer gear set in the high-speed mode (730). When YES (fourth speed of the high-speed mode), decision is made if the lockup inhibition flag is "0" or "1" (731). When "0" (lockup inhibition flag is not placed), an output signal is provided to energize the solenoid valve S3 and to de-energize the solenoid valves S1 and S2 (732) and, when "1" (lockup inhibition flag is placed), an output signal is provided to de-energize the solenoid valves S1, S2 and S3 (733), and then the operation goes to Step 704. When the decision at Step 730 is NO (a condition other than that corresponding to the fourth speed of the high-speed mode), the operation goes to Step 734. When the decision at Step 713 is "1" (solenoid valve S4 is energized), decision is made as to whether or not the running condition of the vehicle corresponds to the first speed with the PS set for the N-pattern and the transfer gear 50 set in the low-speed mode (734). When YES (first speed), the operation goes to Step 715 and, when NO (a speed other than the first speed), decision is made as th whether or not the running condition of the vehicle corresponds to the second speed with the PS set for the N-pattern and the transfer gear 50 set in the low-speed mode (735). When YES (the second speed), decision is made as to whether or not the running condition of the vehicle corresponds to the second speed of the high-speed mode at the lockup point with the PS set for the N-pattern and the transfer gear 50 set in the low-speed mode (736). When "1" (the second speed of the high-speed mode), decision is made if the lockup inhibition flag is "0" or "1" (737). When "0" (lockup inhibition flag is not placed), the operation goes to Step 717 and, when "1" (lockup inhibition flag is placed), the operation goes to Step 720. When the decision at Step 736 is NO (a condition other than that corresponding to the second speed of the high-speed mode), the operation goes to Step 720. When the decision at Step 735 is NO (a speed other than the second speed), decision is made if the first position Mp is the L-range (738). When YES (Mp=L-range), decision is made as to whether or not the running condition requires downshift to the first speed (739). When YES (downshift to the first speed is necessary), the operation goes to Step 715 and, when NO (downshift to the first speed is not necessary), the operation goes to Step 720. When the decision at Step 738 is NO (Mp≠L-range), decision is made as to whether or not the shift position Mp is the S-range (740). When YES (Mp=S-range), decision is made if downshift to the second speed is necessary (741). When YES (downshift to the second speed is necessary), the operation goes to Step 739 and, when NO (downshift is not necessary), the operation goes to Step 727. When the decision at Step 740 is NO (Mp≠S-range), decision is made as to whether or not the running condition of the vehicle corresponds to the third speed of the high-speed mode at the lockup point with the PS set for N-pattern and the transfer gear 50 in the low-speed mode (742). When YES (the third speed of the high-speed mode), decision is made if the lockup inhibition flag is "0" or "1" (743). When "0" (the lockup inhibition flag is not placed), the operation goes to Step 726 and, when "1" (lockup inhibition flag is placed), the operation goes to Step 727. When the decision at Step 742 is NO (a condition other than that corresponding to the third speed in the high-speed mode), the operation goes to Step 727. Step 704 is a transfer gear control routine 800 for changing the transfer gear 50.

The control operation according to the transfer gear control routine 800 will be described with reference to Flow charts shown in FIGS. 8 and 9.

Figures 8, 8A:
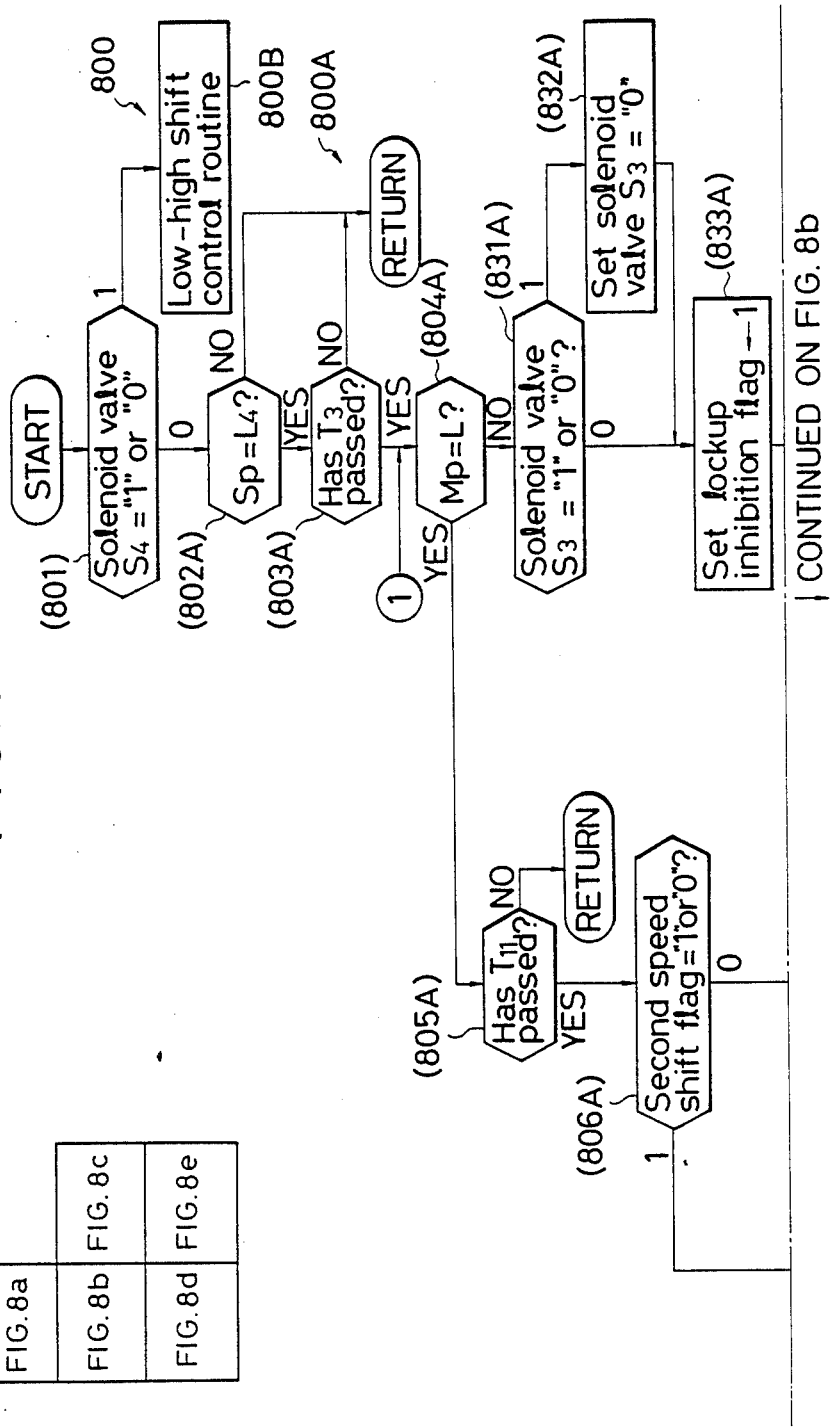
FIGS. 8 and 9 are flow charts showing a transfer gear shift control routine.
Figure 8D:
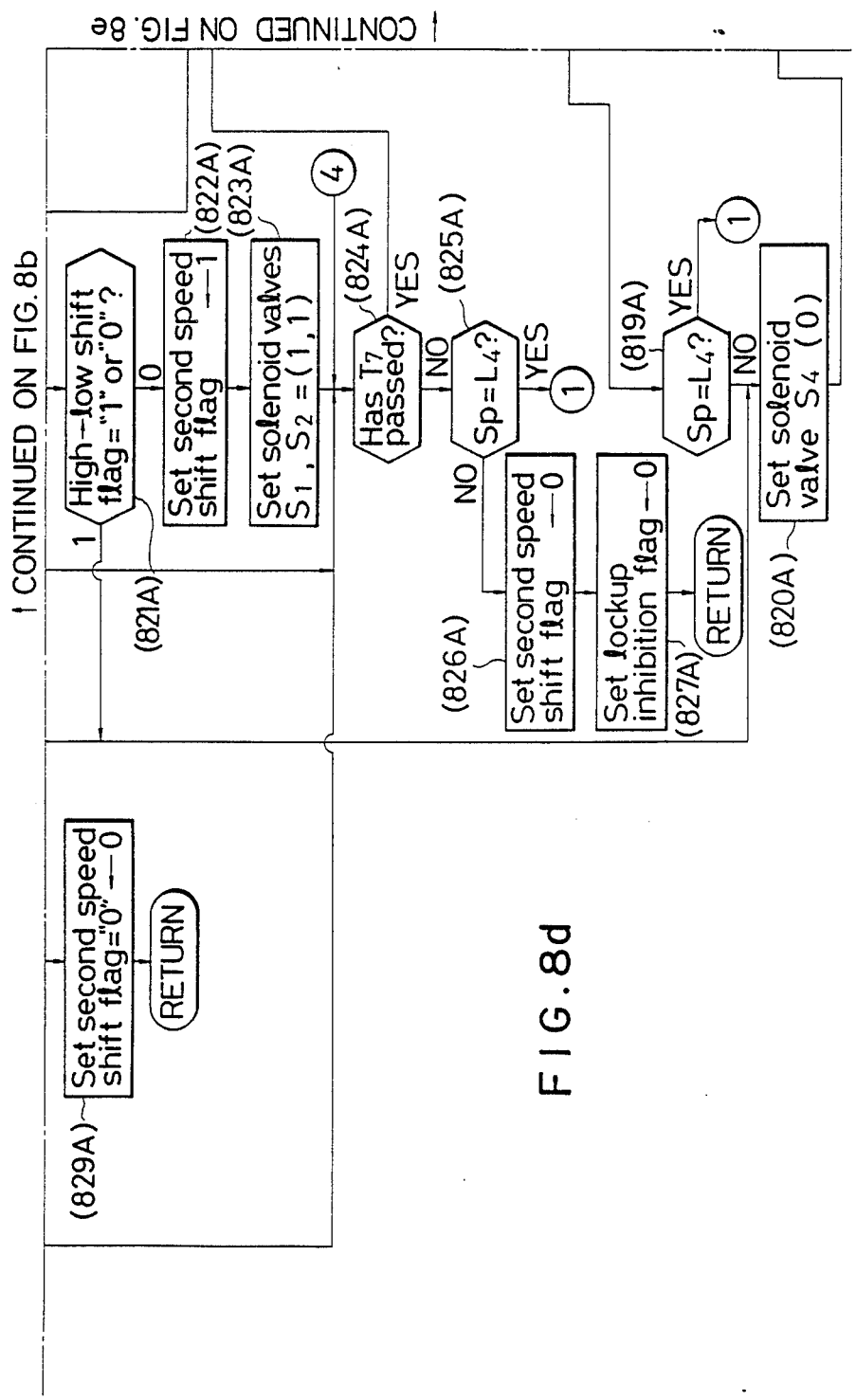
Figure 8E:
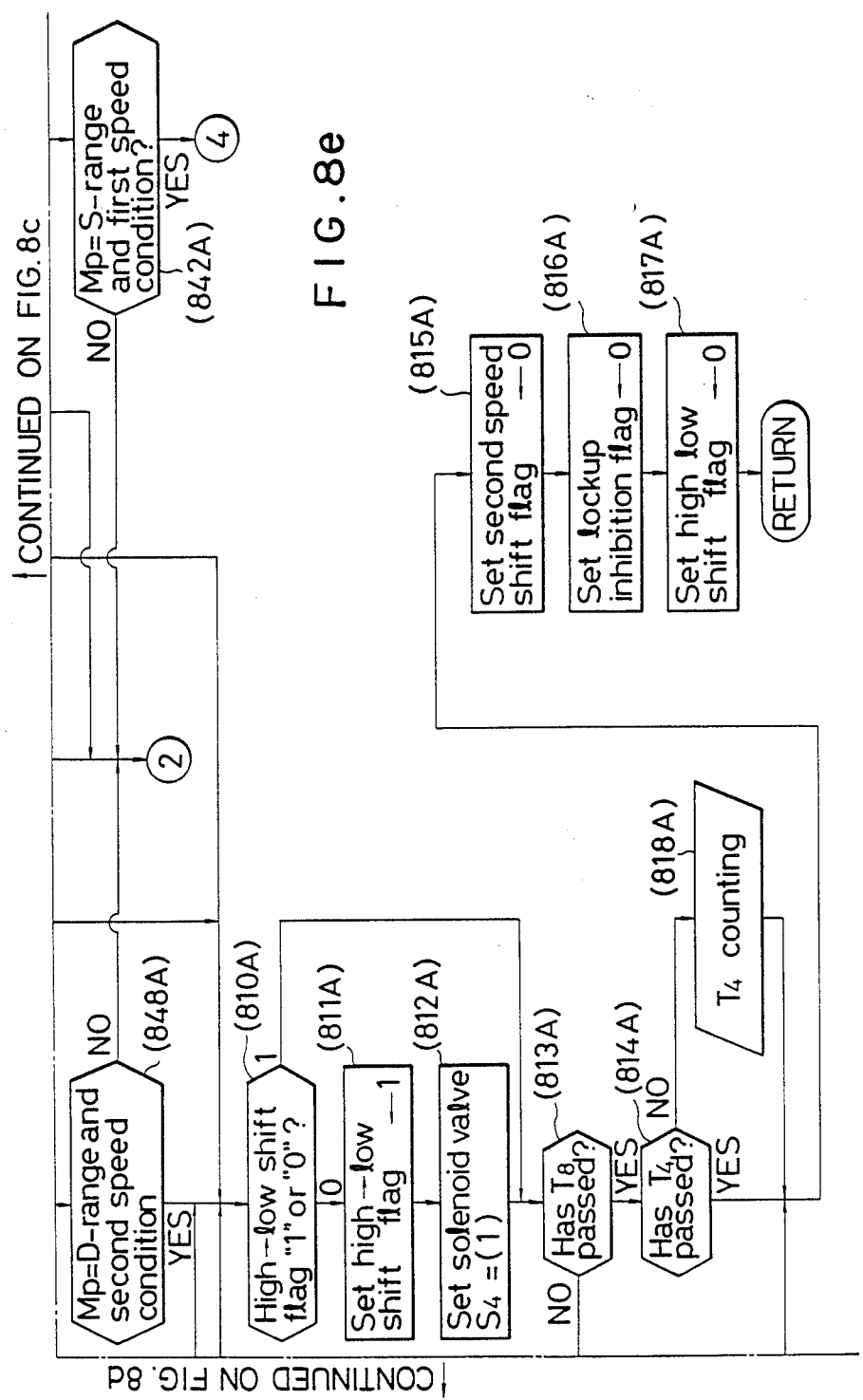

FIG. 8 is a flow chart of the speed change control operation according to the transfer gear control routine 800 for chaging the mode of the transfer gear 50 from the high-speed mode to the low-speed mode.

At Step 801, decision is made as to whether the solenoid valve S4 is energized (indication: 1) or not energized (indication: 0). When "1" (the solenoid valve S4 is energized, decision is made that the transfer gear 50 is in the low-speed mode and the operation goes to a low-speed mode control routine 800B. When "0" (the solenoid valve S4 is not energized), decision is made that the transfer gear 50 is in the high-speed mode and the operation goes to a high-speed mode control routine 800A. Decision is made as to whether or not the shift position Sp of the transfer gear is L-4 range (802A). When NO (Sp≠L-4 range), the operation is returned and, when YES (Sp=L4-range), decision is made that the transfer gear 50 is changed manually from the high-speed mode to the low-speed mode, and then decision is made as to whether or not a set time T3 (a set time from the start to the completion of speed change of the main transmission gear 10) has passed (803A). When NO (the set time T3 has not yet passed), decision is made that the main transmission 10 is in the process of speed change, and then the operation is returned and, when YES (the set time T3 has passed), decision is made that the speed change of the main transmission gear 10 has been completed, and the decision is made as to whether or not the shift position Mp of the main transmission gear 10 is L-range (804A). When YES (Mp=L-range), decision is made as to whether or not a set time T11 (a set time from the start to the completion of the shift position Mp) has passed (805A). When NO (the set time T11 has not yet passed), decision is made if the shift flag of the second speed is "0" (not placed) or "1" (placed) (806A). When "0" (not placed), decision is made as to whether or not the speed of the main transmission gear 10 is the first speed, in which the solenoid valves S1 and S2 are "1" and "0", respectively (807A), and, when NO (the speed of the main transmission gear 10 is not the first speed), decision is made as to whether or not the running condition of the vehicle corresponds to a condition in which the shift position Mp is the L-range, the speed of the main transmission gear 10 is the first speed and the solenoid valve S4 may be energized (808A). When YES (the solenoid valve S4 may be energized, decision is made if the degree of opening $\theta$ of the throttle is below a set degree of opening $\theta a$ (809A). When YES ($\theta < \theta a$), decision is made as to whether a high-low shift flag is "0" (the flag is not placed) or "1" (the flag is placed) (810A). When "0" (not placed), the high-low flag is placed ("1") (811A). Then, an output signal is provided to energize the solenoid valve S4 (812A), and then decision is made whether or not a set time T8 (a time from the energization of the solenoid valve S4 to the start of movement of the spool 441 of the inhibitor valve 440) has passed (813A). When YES (the set time T8 has passed), decision is made as to whether or not a set time T4 (a time from the energization of the solenoid valve S4 to the completion of the speed change of the transfer gear 50 from the high-speed mode to the low-speed mode, namely, a speed change inhibition time for the main transmission gear 10) has passed (814A). When YES (the set time T4 has passed), a second shift flag is changed to "0" (815A), the lockup inhibition flag is changed to "0" (816A), the high-low shift flag is changed to "0", and then the operation is returned. When the decision at Step 814A is NO (the set time T4 has not yet passed), the solenoid valves S1 and S2 of the main transmission gear 10 are held energized to inhibit the speed change of the main transmission gear 10 during the set time T4 (818A). When the decision at Step 813A is NO (the set time T8 has not yet passed), decision is made as to whether or not the shift position Sp of the transfer gear 50 is the L-range (819A). When YES (Sp=L4-range), the operation goes to Step 804A and, when No (Sp≠L4-range), an output signal is provided to de-energize the solenoid valve S4 (820A), and then the operation goes to Step 815A. When the decision at Step 810A is "1" (the high-low flag is placed), the operation goes to Step 813A. When the decision at Step 809A is NO ($\theta > \theta a$), decision is made if the high-low flag is "0" or "1" (821A). When "0" (the flag is not placed), the second speed shift flag is changed to "1" (822A), and then an output signal is provided to energize the solenoid valves S1 and S2 so that the main transmission gear 10 is upshifted to the second speed (823A). Then, decision is made as to whether or not a set time T7 (a set time from the start of the upshift of the main transmission gear 10 upon the detection of the excess of the degree of opening $\theta$ of the throttle valve over the set degree of opening $\theta a$, namely, from the energization of the solenoid valves S1 and S2, to the completion of the upshift operation) has passed (824A). When YES (the set time T7 has passed), the operation goes to Step 810A and, when NO (the set time T7 has not yet passed), decision is made as to whether or not the shift position Sp of the transfer gear 50 is the L4-range (825A). When YES (Sp=L4-range), the operation goes to Step 804A and, when NO (Sp≠L4-range), the shift flag of the second speed is changed to "0" (826A), the lockup inhibition flag is changed to "0", and then the operation is returned. When the decision at Step 821A is "1" (the high-low flag is placed), the operation goes to Step 820A. When the decision at Step 808A is NO (the energization of the solenoid valve S4 is inhibited), decision is made if the high-low shift flag is "0" or "1" (828A). When "0" (the high-low shift flag is not placed), the second speed shift flag is changed to "0" (829A), and then the operation is returned. When the decision at Step 828A is "1" (the second speed shift flag is placed), the operation goes to Step 820A. When the decision at Step 806A is "1" (the second speed flag is placed), decision is made as to whether or not the running condition of the vehicle corresponds to a condition in which the shift position Mp is the L-range, the speed of the main transmission gear 10 is the first speed and the solenoid valve S4 may be energized (830A). When YES (sloenoid valve S4 may be energized), the operation goes to Step 824A and, when NO (the solenoid valve Sr may not be energized), the operation goes to Step 828A. When the decision at Step 804A is NO (Mp≠L-range), decision is made as to whether the solenoid valve S3 for locking up the main transmission gear 10 is energized ("1") or not energized ("0") (831A). When "1" (energized), the solenoid valve S3 is de-energized (832A) and, when "0" (not energized), the lockup inhibition flag is changed to "1" (832A). Then, decision is made whether or not a set time T6 (a set time from the de-energization of the solenoid valve S3 to the disengagement of the direct coupling clutch 16) has passed (834A). When NO (the set time T6 has not yet passed), the operation is returned and, when YES (the set time T6 has passed), decision is made as to whether or not the shift position Mp of the main transmission gear 10 is the S-range (835A). When YES (Mp=S-range), decision is made if a set time T11 has passed after the speed of the main transmission 10 has been changed (836A). When NO (the set time T11 has not yet passed), the operation is returned and, when YES (the set time T11 has passed), decision is made if the second speed flag is "0" or "1" (837A). When "0" (the second speed flag is not placed), decision is made as to whether the solenoid valve S1 is energized ("1") or not energized ("0") (838A). When "0" (not energized), decision is made that the main transmission gear 10 is in the third speed, and then the operation is returned. When the decision at Step 838A is "1" (energized), decision is made as to whether solenoid valve S2 is energized ("1") or not energized ("0") (839A). When "0" (not energized), decision is made that the main transmission gear 10 is in the first speed, and then decision is made as to whether or not the running condition of the vehicle corresponds to a condition in which the shift position Mp is the S-range and the solenoid valve S4 may be energized (840A). When YES (the solenoid valve S4 may be energized), the operation goes to Step 809A and, when NO (the solenoid valve S4 may not be energized), the operation goes to Step 828A. When the decision at Step 839A is YES (the solenoid valve S2 is energized), decision is made that the main transmission gear 10 is in the second speed, and then decision is made as to whether or not the running condition of the vehicle corresponds to a condition in which the shift position Mp is the S-range, the main transmission gear 10 is in the second speed and the solenoid valve S4 may be energized 9841A). When YES (the solenoid valve S4 may be energized), the operation goes to Step 810A and, when NO (the solenoid valve S4 may not be energized), the operation goes to Step 828A. When the decision at Step 837A is "1" (the second speed flag is placed), decision is made as to whether or not the running condition of the vehicle corresponds to a condition in which the shift position Mp is the S-range, the main transmission gear 10 is in the first speed and the solenoid valve S4 may be energized (842A). When YES (the solenoid valve S4 may be energized), the operation goes to Step 824A and, when NO (the solenoid valve S4 may not be energized), the operation goes to 828A. When the decision at Step 835A is NO (Mp≠S-range), decision is made as to whether or not the set time T11 has passed after the range of the main transmission gear 10 has been changed (843A). When NO (the set time T11 has not yet passed), the operation is returned and, when YES (the set time T11 has passed), decision is made as to whether the second speed flag is "0" or "1" (844A). When "0" (the second shift flag is not placed), decision is made as to whether the solenoid valve S1 is energized ("1") or not energized ("0") (845A). When "1" (energized), decision is made as to whether the solenoid valve S2 is energized ("1") or not energized ("0") (846A). When "0" (not energized), decision is made that the main transmission gear 10 is in the first speed, and then decision is made as to whether or not the running condition of the vehicle corresponds to a condition in which the shift position Mp is the D-range, the main transmission gear 10 is in the first speed and the solenoid valve S4 may be energized (874A). When YES (the solenoid valve S4 may be energized), the operation goes to Step 809A and, when NO (the solenoid valve S4 may not be energized), the operation goes to Step 828A. When the decision at Step 846A is "1" (the solenoid valve S2 is energized), decision is made that the main transmission gear 10 is in the second speed, and then decision is made as to whether or not the running condition of the vehicle corresponds to a condition in which the shift position Mp is the D-range, the main transmission gear 10 is in the second speed and the solenoid valve S4 may be energized (848A). When YES (the solenoid vlave S4 may be energized), the operation goes to Step 810A and, when NO (the solenoid valve S4 may not be energized), the operation goes to Step 828A. When the decision at Step 845A is "0" (the solenoid valve S1 is not energized), decision is made as to whether the solenoid valve S2 is energized ("1") or not energized ("0") (849A). When "1" (the solenoid valve S2 is energized), decision is made that the main transmission gear 10 is in the third speed, and then decision is made as to whether or not the running condition of the vehicle corresponds to a condition in which the shift position Mp is the D-range, the main transmission gear 10 is in the third speed and the solenoid valve S4 may be energized (850A). When YES (the solenoid valve S4 may be energized), the operation goes to Step 810A and, when NO (the solenoid valve S4 may not be energized), the operation goes to Step 828A. When the decision at Step 849A is "0" (the solenoid valve S2 is not energized), decision is made that the main transmission gear 10 is in the fourth speed and the operation goes to Step 828A. When the decision at Step 844A is "1" (the second speed flag is placed), decision is made whether the running condition of the vehicle corresponds to a condition in which the shift position Mp is the D-range, the main transmission gear 10 is in the first speed and the solenoid valve S4 may be energized (851A). When YES (the solenoid valve S4 may be energized), the operation goes to Step 828A and, when NO (the solenoid valve S4 may not be energized), the operation goes to Step 828A.

Figure 9C:
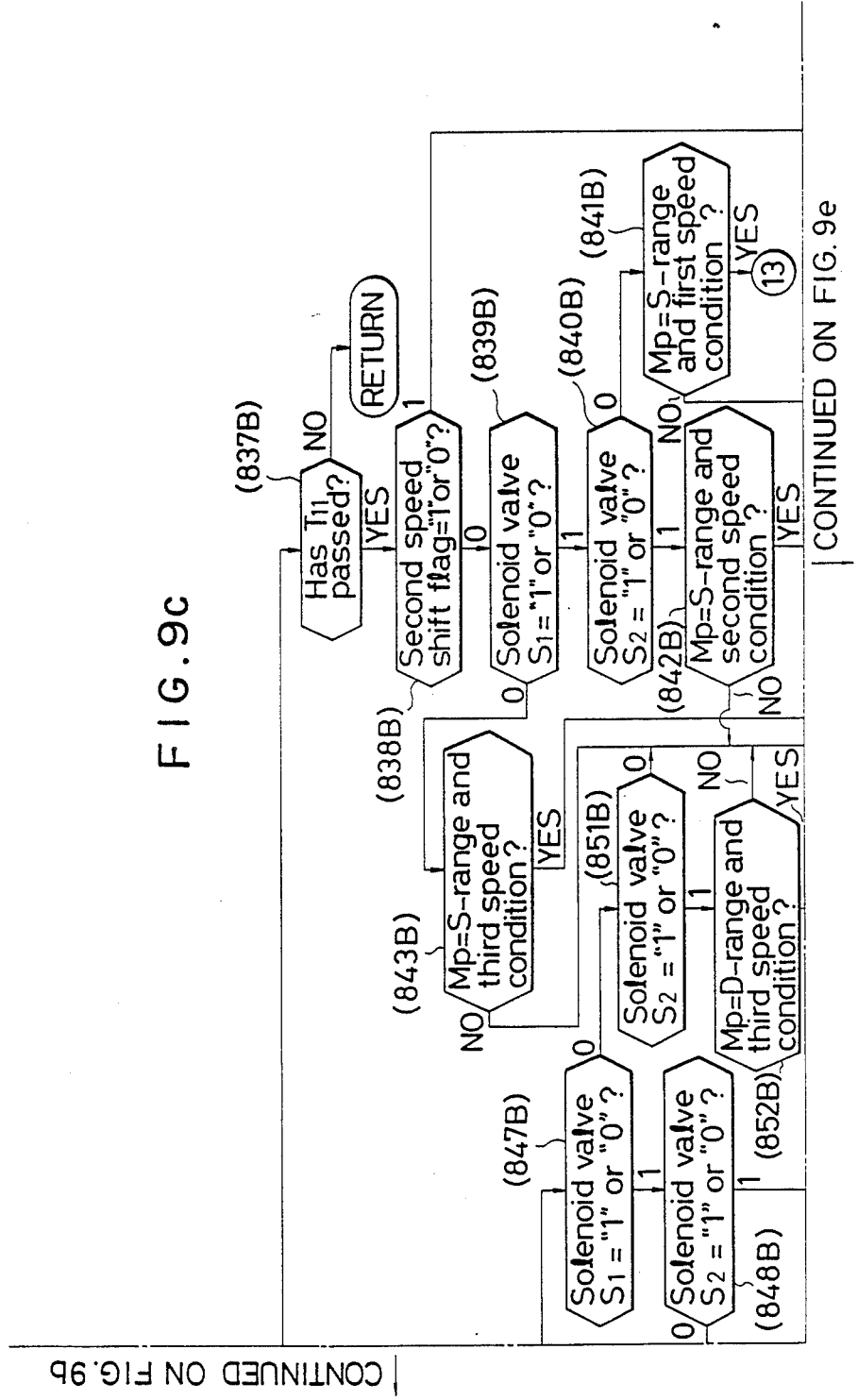
Figure 9D:
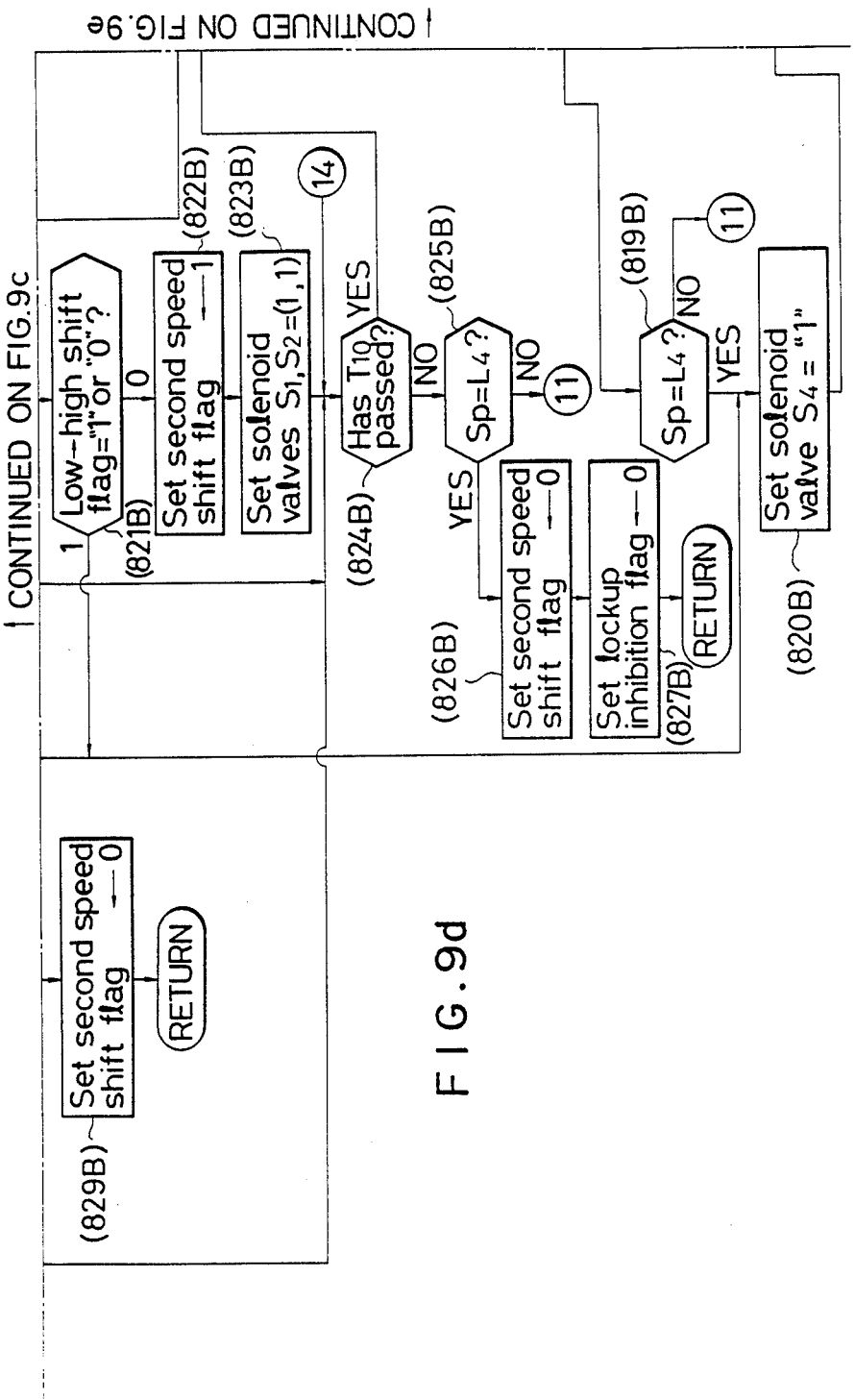

FIG. 9 shows a flow chart of a control process for changing the mode of the transfer gear 50 from the low-speed mode to the high-speed mode according to the transfer gear control routine 800.

At Step 801, decision is made as to whether the solenoid valve S4 is energized ("1") or not energized ("0"). When "0" (not energized), decision is made that the transfer gear 50 is in the high-speed mode, and the operation goes to the high-speed mode control routine 800A and, when "1" (the solenoid valve S4 is energized), decision is made that the transfer gear 50 is in the low-speed mode, and then the operation goes to the low-speed mode control routine 800B. Decision is made as to whether or not the shift position Sp of the transfer gear 50 is the L-range (802B). When YES (Sp=L4-range), the operation is returned and, when NO (Sp≠L4-range), decision is made that the transfer gear 50 has been changed from the low-speed mode to the high-speed mode, and then decision is made as to whether or not a set time T3 (a set time from the start of the speed change of the main transmission gear 10 to the completion of the same) has passed after the start of the speed change of the main transmission gear 10 (803B). When NO (the set time T3 has not yet passed after the start of the speed change of the main transmission gear 10), decision is made that the main transmission 10 is in the speed change process, and then the operation is returned and, when YES(the set time T3 has passed after the start of the speed change of the main transmission gear 10), decision is made that the speed change of the main transmission gear 10 has been completed, and then decision is made as to whether or not the shift position Mp of the main transmission gear 10 is the L-range (804B). When YES (Mp=L-range), decision is made as to whether the set time T11 (a set time from the start to the completion of the Mp) has passed after the rnage change operation of the main transmission gear 10 (805B). When NO (the set time T11 has not yet passed), the operation is returned and, when YES (the set time T11 has passed), decision is made as to whether the second speed shift flag is "0" (not placed) or "1" (placed) (806B). When "0" (not placed), decision is made as to whether or not the main transmission gear 10 is in the first speed, in which the solenoid valve S1 is "1", while the solenoid valve S2 is "0" (807B). When YES (first speed), decision is made whether or not the running condition of the vehicle corresponds to a condition in which the shift position Mp is the L-range, the main transmission gear 10 is in the first speed and the solenoid valve S4 may not be energized (808B). When YES (the solenoid valve S4 may not be energized), decision is made as to whether or not the degree of opening $\theta$ of the throttle is below a set degree of opening $\theta b$ (809B). When YES ($\theta < \theta b$), decision is made as to whether the low-high shift flag is "0" (not placed) or "1" (placed) (810B). When "0" (not placed), the low-high shift flag is changed to "1" (811B). Then, an output signal is provided to de-energize the solenlid valve S4 (812B), and then decision is made as to whether or not the set time T8 (a set time from the de-energization of the solenoid valve S4 to the start of movement of the spool 441 of the inhibitor valve 440) has passed (831B). When YES (the set time T8 has passed), decision is made as to whether or not a set time T5 (a set time from the de-energization of the solenoid valve S4 to the completion of the change of the mode of the transfer gear 50 from the low-speed mode to the high-speed mode), namely, the speed change inhibition time for the main transmission gear 10, ahs passed (841B). When YES (the set time T5 has passed), the second speed shift flag is changed to "0" (815B), the lockup inhibition flag is changed to "0" (816B), the low-high shift flag is changed to "0" (817B), and then the operation is returned. When the decision at Step 814B is NO (the set time T5 has not yet passed), the solenoid valves S1 and S2 of the main transmission gear 10 are held energized to inhibit the speed change of the main transmission grear 10 (818B). When the decision at Step 813B is NO (the set time T9 has not yet passed), decision is made as to whether or not the shift position Sp of the transfer gear 50 is the L4-range (819B). When NO (Sp≠L4-range), the operation goes to Step 804B and, when YES (Sp=L4-range), an output signal is provided to energize the solenoid valve S4 (820B), and then the operation goes to Step 815B. When the decision at Step 810B is "1" (the low-high shift flag is placed), the operation goes to Step 813B. When the decision at Step 809B is NO ($\theta > \theta b$), decision is made as to whether the low-high shift flag is "0" or "1" (821B). When "0" (the low-high shift flag is not placed), the second speed shift flag is changed to "1" (822B) and an output signal is provided to energize the solenoid valves S1 and S2 so that the main transmission gear 10 is upshifted from the first speed to the second speed (823B). Then, decision is made as to whether or not a set time T10 (a set time from the start to the completion of the upshift to the main transmission gear 10, namely, a set time from the energization of the solenoid valves S1 and S2 to the completion of the upshift of the main transmission gear 10) has passed (824B). When YES (the set time T10 has passed), the operation goes to Step 810B and, when NO (the set time T10 has not yet passed), decision is made as to whether or not the shift position Sp of the transfer gear 50 is the L-range (825B). When NO (Sp≠L4-range), the operation goes to Step 804B and, when YES (Sp=L4-range), the second speed shift flag is changed to "0" (826B), the lockup inhibition flag is is changed to "0" (827B), and then the operation is returned. When the decision at Step 821B is "1" (low-high shift flag is placed), the operation goes to Step 820B. When the decision at Step 808B is NO (a condition other than that in which the solenoid valve S4 may not be energized), decision is made as to whether the low-high shift flag is "0" or "1" (828B). When "0" (not placed), the second speed shift flag is changed to "0" (829B), and the operation is returned. When the decision at Step 828B is "1" (second speed shift flag is placed), the operation goes to Step 820B. When the decision at Step 807B is NO (the main transmission gear 10 is not in the first speed), decision is made that the main transmission 10 is in the second speed, and then decision is made as to whether or not the running condition of the vehicle corresponds to a condition in which the shift position Mp is the L-range and the solenoid valve S4 may not be energized (830B). When YES (the solenoid valve Sr may not be energized), the operation goes to Step 810B and, when NO (a condition other than that in which the solenoid valve S4 may not be energized), the operation goes to Step 828B. When the decision at Step 806B is "1" (the second speed shift flag is placed), decision is made as to whether or not the running condition of the vehicle corresponds to a condition in which the shift position Mp is the L-range, the main transmission 10 is in the first speed and the solenoid valve S4 may not be energized (831B). When YES (the solenoid valve S4 may not be energized), the operation goes to Step 824B and, when NO (a condition other than that in which the solenoid valve S4 may not be energized), the operation goes to Step 828B. When the decision at Step 804B is NO (Mp≠L-range), decision is made as to whether the solenoid valve S3 for the lockup control of the main transmission gear 10 is energized ("1") or not energized ("0") (832B). When "1" (the solenoid valve S3 is energized), the solenoid valve S3 is de-energized (833B) and, when "0" (the solenoid valve S3 is not energized), the lockup inhibition flag is changed to "1" (834B). Then, decision is made as to whether or not the set time T6 (a set time from the de-energization of the solenoid valve S3 to the disengagement of the direct coupling clutch 16) has passed (835B). When NO (the set time T6 has not yet passed), the operation is returned and, when YES (the set time T6 has passed), decision is made as to whether the shift position Mp of the main transmission gear 10 is the S-range (836B). When YES (Mp=S-range), decision is made as to whether or not the set time T11 has passed after the range change operation of the main transmission gear 10 (837B). When NO (the set time T11 has not yet passed), the operation is returned and, when YES (the set time T11 has passed), decision is made if the second speed shift flag is "0" or "1" (833B). When "0" (the second speed shift flag is not placed), decision is made as to whether the solenoid valve S1 is energized ("1") or not energized ("0") (839B). When "1" (the solenoid valve S1 is energized), decision is made if the solenoid valve S2 is energized ("1") or not energized ("0") (840B). When "0" (the solenoid valve S2 is not energized), decision is made that the main transmission gear 10 is in the first speed, and then decision is made as to whether or not the running condition of the vehicle corresponds to a condition in which the shift position Mp is the S-range, the main transmission gear 10 is in the first speed and the solenoid valve S4 may not be energized (841B). When YES (the solenoid valve S4 may not be energized), the operation goes to Step 809B and, when NO (a condition other than that in which the solenoid valve valve S4 may not be energized), the operation goes to Step 828B. When the decision at Step 840B is YES (the solenoid valve S2 is energized), decision is made that the main transmission gear 10 is in the second speed, and then decision is made as to whether or not the running condition of the vehicle corresponds to a condition in which the shift position Mp is the S-range, the main transmission gear 10 is in the second speed and the solenoid valve S4 may not be energized (824B). When YES (the solenoid valve S4 may not be energized), the operation goes to Step 810B and, when NO (a condition other than that in which the solenoid valve S4 may not be energized), the operation goes to Step 828B. When the decision at Step 829B is "0" (the solenoid valve S1 is not energized), decision is made that the main transmission gear 10 is in the third speed, and then decision is made as to whether or not the running condition of the vehicle corresponds to a condition in which the shift position Mp is the S-range, the main transmission gear is in the third speed and the solenoid valve S4 may not be energized (843B). When YES (the solenoid valve S4 may not be energized), the operation goes to Step 810B and, when NO (a condition other than that in which the solenoid valve S4 may not be energized), the operation goes to Step 828B. When the decision at Step 837B is "1" (the second speed shift flag is placed), decision is made as to whether or not the running condition corresponds to a condition in which the shift position Mp is the S-range, the main transmission gear 10 is in the first speed and the solenoid valve S4 may not be energized (844B), and then the operation goes to Step 824B when the decision at Step 844B is YES (the solenoid valve S4 may not be energized). when the decision at Step 844B is NO (a condition other than that in which the solenoid valve S4 may not be energized), the operation goes to Step 828B. When the decision at Step 836B is NO (MP≠S-range), decision is made as to whether or not the set time T11 has passed after the main transmission gear 10 was operated for range change (845B). When NO (the set time T11 has not yet passed), the operation is returned and, when YES (the set time T11 has passed), decision is made as to whether the second speed shift flag is "0" or "1" (846B). When "0" (the second speed shift flag is not palced), decision is made as to whether the solenoid valve S1 is energized ("1") or not energized ("0") (847B). When "1" (the solenoid valve S1 is energized), decision is made as to whether the solenoid valve S2 is energized ("1") or not energized ("0") (848B). When "0" (the solenoid valve S2 is not energized), decision is made that the main transmission gear 10 is in the first speed, and then decision is made as to whether or not the running condition of the vehicle corresponds to a condition in which the shift position Mp is the D-range, the main transmission gear 10 is in the first speed and the solenoid valve S4 may not be energized (849B). When YES (the solenoid valve S4 may not be energized), the operation goes to Step 809B and, when NO (a condition other than that in which the solenoid valve S4 may not be energized), the operation goes to Step 828B. When the decision at Step 848B is "1" (the solenoid valve S1 is energized), decision is made that the main transmission gear 10 is in the second speed, and then decision is made as to whether or not the running condition of the vehicle corresponds to a condition in which the shift position Mp is the D-range, the main transmission gear 10 is in the second speed and the solenoid valve S4 may not be energized (850B). When YES (the solenoid valve S4 may not be energized), the operation goes to Step 810B and, when NO (a condition other than that in which the solenoid valve S4 may not be energized), the operation goes to Step 828B. When the decision at Step 847B is "0" (the solenoid valve S1 is not energized), decision is made as to whether the solenoid valve S2 is energized ("1") or not energized ("0") (851B). When "1" (the solenoid valve S2 is energized), decision is made that the main transmission gear 10 is in the third speed, and then decision is made as to whether or not the running condition of the vehicle corresponds to a condition in which the shift position Mp is the D-range, the main transmission gear 10 is in the third speed and the solenoid valve S4 may not be energized (852B). When YES (the solenoid valve S4 may not be energized), the operation goes to Step 810B and, when NO (a condition other than that in which the solenoid valve S4 may not be energized), the operation goes to Step 828B. When the decision at Step 815B is "0" (the solenoid valve S2 is not energized), decision is made that the main transmission gear 10 is in the fourth speed, and then the operation goes to Step 828B. When the decision at Step 846B is "1" (the second speed shift flag is placed), decision is made as to whether or not the running condition of the vehicle corresponds to a condition in which the shift position Mp is the D-range, the main transmission gear 10 is in the first speed and the solenoid valve S4 may not be energized (853B). When YES (the solenoid valve S4 may not be energized), the operation goes to Step 824B and, when NO (a condition other than that in which the solenoid valve S4 may not be energized), the operation goes to Step 828B.

As shown in the flow charts, when the transfer shift lever of the transfer gear 50 is thrown from the high-speed range into the low-speed range, the electronic control unit provides a speed change inhibition signal to inhibit the energization of the solenoid valve S4 so that the speed change from the high-speed mode into the low-speed mode is inhibited while the running condition of the vehicle is not suitable for the low-speed mode. The electronic control unit provides a speed change command to energize the solenoid valve S4 so that the transfer gear 50 is changed from the high-speed mode into the low-speed mode, when the running condition of the vehicle becomes suitable for the low-speed mode. In such an occasion, when decision is made that the running condition of the vehicle is not suitable for speed change from the high-speed mode into the low-speed mode and that the speed change form the high-speed mode into the low-speed mode should be inhibited, within the first set time T8 (a time from the energization of the solenoid valve S4 to the start of the downward movement of the spool 441 of the inhibitor valve 440) within the set time T4 (a time from the energization of the solenoid valve S4 to the completion of the speed change operation), since the spool 441 is not moved, the working fluid is supplied to the hydraulic servomechanism C-3 and the hydraulic servomechanism B-4 is drained within the first set time T8, the solenoid valve S4 is de-energized again. When decision is made that the running condition of the vehicle is not suitable for speed change from the high-speed mode into the low-speed mode within the second set time (a time after the passage of the first set time T8 within the set time T4, namely, a time from the start of the downward movement of the spool 441 to the completion of the speed change operation), since the spool 441 is moved downward, the hyraulic servomechanism C-3 is drained and the working fluid is being supplied to the hydraulic servomechanism B-4, hence, the hydraulic servomechanism B-4 is in a transient state, the energization of the solenoid valve S4 is not interrupted even if decision is made within the second set time that the speed change should be inhibited, and hence the speed change from the high-speed mode into the low-speed mode is carried out, and then, the running condition of the vehicle is examined again after the second set time T4 has passed. When the transfer shift lever of the transfer gear 50 is shifted from the low-speed range to the high-speed range, the electronic control unit provides a speed change inhibition signal to inhibit the de-energization of the solenoid valve S4 so that the speed change from the low-speed mode into the high-speed mode is inhibited, when the running condition of the vehicle is not suitable for such speed change. When the running condition of the vehicle becomes suitable for speed change from the low-speed mode into the high-speed mode, the electronic control unit provides a signal to de-energize the solenoid valve S4. If decision is made within the first set time T9 (a time from the de-energization of the solenoid valve S4 to the start of the upward movement of the spool 441 of the inhibitor valve 440) within the set time T5 (a time from the de-energization of the solenoid valve S4 to the completion of the speed change operation) that the running condition of the vehicle is not suitable for speed change from the low-speed mode into the high-speed mode, since the spool 441 is not yet shifted, the hydraulic servomechanism C-3 is drained and the working fluid is supplied to the hydraulic servomechanism B-4, the solenoid valve S4 is energized again. When decision is made within the second set time (a time from the start of the upward movement of the spool 441 after the passage of the first set time T9 to the completion of the speed change operation within the set time T5), that the running condition is not suitable for such speed change, since the spool 441 is moved upward, the working fluid is supplied to the hydraulic servomechanism C-3 and the hydraulic servomechanism B-4 is drained within the second set time, the solenoid valve S4 is held de-energized, and hence the speed change from the low-speed mode into the high-speed mode is carried out. After the set time T5 has passed, the running condition of the vehicle is examined again for speed change.

In this embodiment, the set time T4 and the set time T5, namely, the time from the decision of speed change by the electronic control unit to the completion of the speed change operation, are controlled by a timer circuit, however, it is also possible to employ means for detecting the stabilization of the fluid pressure in the hydraulic servomechanisms, the complete termination of torque variation attributable to the speed change operation and the completion of the speed change operation through the detection of the torque by a torque detector, or means for detecting the completion of the speed change operation by a revolving speed detector.

Furthermore, in this embodiment, the first set time T8 and the first set time T9 are controlled by a timer circuit, however, it is also possible to detect the stage of the speed change process through the detection of the position of the relevant spool by an electric switch and through the detection of the condition of the hydraulic circuit by fluid pressure detectors.

Still further, in this embodiment, the main transmission gear employs planetary gearings, however, the main transmission gear may employ other speed change mechanisms, such as a plurality of gear trains or continuously-variable speed transmissions.

Furthermore, in this embodiment, the transfer gear employs a planetary gearing and is a two-speed transmission having a high-speed range and a low-speed range, however, a transmission having a plurality of gearing adapted to be controlled by electromagnetic clutches or the like under the control of an electronic control unit or a continuously variable transmission operated by hydraulic actuators under the control of an electronic control unit may be used as the transfer.

Still further, in this embodiment, the transfer gear is a four-wheel drive transfer gear for transmitting power to either the rear wheels or the rear and front wheels. However, the present invention is not limited to a four-wheel drive transmission, but is applicable to any transmission comprising a main transmission gear and an auxiliary transmission.

Although the invention has been described in its preferred form with a certain degree of particularlity, it is to be understood that many changes and variations are possible in the invention without departing the scope and spirit thereof.

We claim:

1. A transmission control system for controlling a transmission, comprising
    a main transmission having a speed changing mechanism and an output shaft,
    a subtransmission connected to the output shaft of the main transmission,
    a control system for receiving outputs from a plurality of sensor means for sensing running state of a vehicle, said control system having first and second outputs,
    first hydraulic control means for controlling the speed changing mechanism of the main transmission and controlled by the first output from the control system,
    second hydraulic control means for controlling the speed changing mechanism of the subtransmission and controlled by the second output from the control system, and
    a hydraulic pressure source for supplying a working fluid to the first and second hydraulic control means,
    wherein said control system determines whether the main and the subtransmissions are in a transient period of the speed changing operation and said control system inhibits, as long as at least one of the main and subtransmission is in the transient period, the speed changing operation of the other transmission.

2. A transmission control system according to claim 1, wherein said subtransmission includes means for changing the vehicle speed.

3. A transmission control system according to claim 1, wherein said subtransmission includes means for changing mutually between two-wheel drive and four-wheel drive.

* * * * *